US011283384B2

(12) United States Patent
Nashiki

(10) Patent No.: US 11,283,384 B2
(45) Date of Patent: *Mar. 22, 2022

(54) MOTOR SYSTEM PROVIDED WITH BOTH MOTOR HAVING MULTIPLE-PHASE STATOR WINDINGS AND CONTROL DEVICE CONTROLLING THE MOTOR

(71) Applicant: Masayuki Nashiki, Aichi-ken (JP)

(72) Inventor: Masayuki Nashiki, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/477,547

(22) PCT Filed: Dec. 1, 2017

(86) PCT No.: PCT/JP2017/043247
§ 371 (c)(1),
(2) Date: Dec. 3, 2019

(87) PCT Pub. No.: WO2018/131318
PCT Pub. Date: Jul. 19, 2018

(65) Prior Publication Data
US 2020/0127589 A1    Apr. 23, 2020

(30) Foreign Application Priority Data
Jan. 16, 2017  (JP) .............................. JP2017-004944

(51) Int. Cl.
*H02P 23/00* (2016.01)
*H02P 25/08* (2016.01)
*B60L 15/20* (2006.01)

(52) U.S. Cl.
CPC ............ *H02P 23/009* (2013.01); *B60L 15/20* (2013.01); *H02P 25/08* (2013.01)

(58) Field of Classification Search
CPC ........ H02P 23/009; H02P 25/08; H02P 31/00; H02P 7/298; B60L 15/20; Y02T 10/64; Y02T 10/72; H02K 23/60; H02K 21/046
See application file for complete search history.

(56) References Cited

U.S. PATENT DOCUMENTS 4,004,203 A * 1/1977 Chalmers ................ H02P 23/06
318/713
4,573,003 A    2/1986 Lipo
(Continued)

FOREIGN PATENT DOCUMENTS

| CN | 1825739 | 8/2006 |
| EP | 2782226 | 9/2014 |

(Continued)

OTHER PUBLICATIONS

Hiroki Hijikata et al., "Larger Torque Production . . . Air-gap Flux Density", IEE—Japan Industry Applications Society Conference, 2016.

(Continued)

*Primary Examiner* — Bickey Dhakal
(74) *Attorney, Agent, or Firm* — Clark & Brody LP

(57) ABSTRACT

A motor has stator windings arranged on a circumference of a stator, a rotor with rotor magnetic poles provided by N- and S-poles, and rotor windings arranged in a circumferential direction of the rotor magnetic poles. Multiple-phase currents are supplied to the stator windings. A current is supplied to rotor windings. The multiple-phase currents include torque current components, which are arranged to be opposite in directions to torque current components of the current. By this mutually opposite-directional current arrangement, a magnetomotive force based on a sum of both torque current components becomes a local minimum. It is possible to reduce influence of the torque current components on the field magnetic fluxes of the motor. In the motor, (Continued)

circumferential magnetic flux components can be collected to an airgap and a portion therearound, so that a larger amount of torque can be obtained, and constant output control can be performed more easily.

11 Claims, 13 Drawing Sheets

(56) References Cited

U.S. PATENT DOCUMENTS

| | | | |
|---|---|---|---|
| 5,418,446 A | 5/1995 | Hallidy | |
| 2003/0127273 A1* | 7/2003 | Fukumoto | G01D 5/2452 180/400 |
| 2005/0073281 A1* | 4/2005 | Kerlin, IV | H02P 6/00 318/749 |
| 2006/0061336 A1* | 3/2006 | Anghel | H02P 9/30 322/59 |
| 2008/0079375 A1 | 4/2008 | Seguchi | |
| 2009/0302788 A1* | 12/2009 | Mitsuda | H02P 3/18 318/376 |
| 2015/0155810 A1* | 6/2015 | Yamada | H02K 19/12 318/400.02 |
| 2015/0244303 A1* | 8/2015 | Gao | H02P 31/00 290/32 |

FOREIGN PATENT DOCUMENTS

| | | |
|---|---|---|
| JP | 53-810 | 1/1978 |
| JP | 62-104491 | 5/1987 |
| JP | 06-205570 | 7/1994 |
| JP | 06-253510 | 9/1994 |
| JP | 2006-521080 | 9/2006 |
| JP | 2008-109823 | 5/2008 |
| JP | 2015-065803 | 4/2015 |
| WO | 2014/057333 | 4/2014 |

OTHER PUBLICATIONS

Xiaogang Luo et al., "A novel two phase doubly salient permanent magnet motor", Conference Record of the 1996 IEEE Industry Applications Conference, 31$^{st}$ IAS Annual Meeting, vol. 2, Oct. 6, 1996, pp. 808-815, XP010201391.

* cited by examiner

MOTOR SYSTEM PROVIDED WITH BOTH MOTOR HAVING MULTIPLE-PHASE STATOR WINDINGS AND CONTROL DEVICE CONTROLLING THE MOTOR

CROSS-REFERENCE TO RELATED APPLICATIONS

This application is based on and claims the benefit of priority from earlier PCT international application number PCT/JP2017/043247 filed on Dec. 1, 2017, which is also based on Japanese Patent Application No. 2017-004944 filed on Jan. 16, 2017, the description of which is incorporated herein by reference.

BACKGROUND

Technical Field

The present invention is concerned with a technique for motors which can be applied to applications which requires a high peak torque, applications which need constant output control under weakened field control or application which need both such torture and control. Practically, the present invention concerns with motors for main machines mounted in electric vehicles EV, industrial motors, and motors for aircraft. In terms of motor techniques, the present invention provides motors and control apparatuses therefor, which are able to control both amplitudes of field magnetic fluxes and torque, and more practically, motors and control apparatuses therefor, which generate an armature reaction during generation of a high peak of torque.

Related Art

At present, Interior Permanent Magnet motors are used as main-machine motors for hybrid vehicles and industrial motors. It is expected in the future that such motors will be mounted widely on compact-size and large-size electric vehicles. However, when the vehicle climbs a steep slope, larger torque in lower rotation speeds is required, which results in a decrease in the power factor in the larger torque generation period. That problem comes from operating points which are in an area "A" in FIG. 27, which shows a characteristic defined by rotation speeds V and torque amounts T in FIG. 27. This characteristic, which is a constant output characteristic and is defined the torque amounts T taken along an axis of ordinate and the rotation speeds V taken along an axis of abscissa. For example, if a power factor reduces down to 0.6, a motor current increases 1.666 times and a motor copper loss increases 2.777 times, compared with comparison with those factors provided when the motor has a power factor of 1. As a result, the motor suffers from being lowered in power efficiency, thereby making the motor larger in size in order to secure a desired power efficiency, and increasing production cost thereof. Additionally, an inverter which drives the motor cannot be avoided from being larger in size.

Meanwhile, when the vehicle runs on an expressway, the vehicle-mounted motor needs a higher-speed rotation, in which it is difficult to freely perform weakened field control of the motor. In such a situation, the motor voltage tends to be excessively larger, which can be seen as an operating point in a range B in FIG. 27. In this case, a driving inverter is forced to have a larger load, thereby reducing the power factor and raising the size and production cost thereof. When the torque is larger, the field magnetic fluxes should be as large as possible, whilst, in a higher-speed rotation of the motor, the field magnetic fluxes should be as low as possible. This means that, in these two driving modes, the field magnetic fluxes are desired to be controlled under mutually conflicting characteristics.

By the way, interior permanent magnet motors have a drawback which results from positional changes in the field magnetic fluxes in the circumferential direction. Such positional changes are due to an armature reaction which is caused by torque current components. Another cause for such positional changes is due to the fact that, since the motors have many permanent magnets to increase a motor power efficacy, the field magnetic fluxes should be weakened in a controlled manner in a higher-speed rotation range. The armature reaction brings an adverse effect, which is for example a distribution of the field magnetic fluxes becomes nonuniform in the circumferential direction due to electromagnetic effects which are attributable to torque current comments.

Meanwhile, as motors having a power of 10 kW or more, a synchronous motor with field windings or a synchronous generator is used in in an industrial application field. Such motors have no permanent magnets, thereby being led to reduced production cost. FIG. 28 exemplifies a lateral section of such a motor. For the sake of an easier understanding, the motor is illustrated as a two-pole motor. Specifically, this motor is a three-phase AC motor with U-, V- and W-phases, with distributed windings whose distribution number is 2, and with slots whose number is 12. In a rotor position illustrated in FIG. 28, the rotor magnetic poles are positioned at the upper and lower parts in the figure and a d-axis is directed upward and a q-axis is directed leftward in the figure. Normally, an inverter with power transistors is used to perform PWM control or other control of such a motor, based on sinusoidal-wave voltages and currents.

In FIG. 28, a reference number 261 denotes a stator, a reference number 262 denotes a rotor, and reference numbers 263, 264, 265 and 266 denote, among three-phase windings, U-phase windings which are wound in a full-pitch and distributed winding manner. For example, the winding 263 is wound to pass from the front side to the rear side in the figure drawing and connected with the winding 264 at a coil end portion. The winding 264 returns to the winding 263 from the rear side to the front side in the figure drawing. In this way, the windings 263 and 264 are wound by a predetermined number of winding. This winding manner is also applied to the windings 265 and 266, in which, these two pairs of U-phase distributed windings are normally connected in series with each other. Reference numbers 267, 268, 269 and 26A denote, among the three phases, V-phase windings which are also provided as full-pitch and distributed windings. Similarly, reference numbers 26B, 26C, 26D and 26E denote, among the three phases, W-phase windings which are also provided as full-pitch and distributed windings. The reference numbers 263 and 26K denote field windings, in which the reference number 263 shown by a circular symbol with a "x" mark shows a field current Ifcm passing from the front to the rear in the drawing paper, while the reference number 26K shows a field current Ifcm passing the rear to the front in the drawing paper. This field current Ifcm generates field magnetic fluxes passing the lower side to the upper side in the drawing paper.

A phenomenon and its problems which occur when torque current components are supplied to the stator U-, V- and W-phase windings will now be explained. It is assumed that the U-, V- and W-phase windings are star-connected to each other, a current Ipcm is supplied to pass through the U-phase windings to the W-phase windings. Now assume a time phase at which the V-phase current becomes 0 amperes. At this time phase, through the windings 263, 265, 26C and 26E, currents (precisely, each is defined as "the current Ipcm×the number of winding turns") pass from the front to the rear in the drawing paper of FIG. 28, as shown by the winding symbol. At the same time, through the windings 264, 266, 26B and 26D, currents (precisely, each is defined as "the current Ipcm×the number of winding turns") pass from the rear to the front in the drawing paper of FIG. 28, as shown by the winding symbol. Hence, electromagnetic interactions between these torque current components and the field magnetic fluxes provide the rotor with torque in the counterclockwise rotation direction CCW.

However, in this case, there occurs a problem that the field magnetic fluxes directed upward in the drawing paper of FIG. 28 will be influenced by an armature reaction caused by the torque current components. That is, due to such armature reaction, the field magnetic fluxes are obliged to be directed obliquely (i.e., distorted) in their directions, as indicated by magnetic flux lines shown by two-dot chain lines 26F, 26G and 26H. As a result of this magnetic flux distortion, the phases between voltages and currents are shifted, thus lowering the power factor, thus reducing power efficiency of the motor. In particular, when larger torque is desired by supplying larger amounts of current, the armature reaction will also become larger. In this case, even if the torque current components are increased, an increase in the torque output is greatly suppressed, which is referred as a torque saturation phenomenon. Although one of the countermeasures for reducing this torque saturation is to increase the field currents Ifcm, an increase in the field currents results in an increase of generated heat. An alternative is to advance or delay the phases of the stator currents, but other drawbacks occur, which weakens improvement of the phase adjustment. Compared to the two-pole motor exemplified in FIG. 28, practical motors are given eight or more poles. Such practical motor configurations are confronted with a more practical issue that there will be short for arrangement space of the field windings 26J and 26K. In addition, such configurations will be led to an increase in the motor size, thereby increasing the weight and production cost.

By the way, the rotor shown in FIG. 28 is configured as a salient pole type of rotor, which is used in applications which need relatively lower rotation speeds. Meanwhile, FIG. 29 exemplifies a synchronous motor whose rotor configuration is referred to as a cylindrical type rotor. This synchronous motor is used mainly for applications which involve higher rotation speeds. Corresponding field windings to the field windings 263 and 26K shown in FIG. 28 are also provided in the example of FIG. 29, but are divided into five field windings, such as shown by reference numbers 26L and 26M, and wound through the respective slots. The field windings 26L and 26M are accommodated in the respective slots, which strengthens supports against the centrifugal force. Two-dot chain lines 26M illustrate the field magnetic fluxes of whose N- and S-poles are located in the upper and lower sides in the drawing, which magnetic fluxes are provided when the torque current components are zero.

CITATION LIST

Patent Literature

[PTL 1] JP A H05-236714
[PTL 2] JP A 2015-65803

Non-Patent Literature

[Non PTL 1] 2016 IEE-Japan Industry Applications Society Conference, 3_36 (formula 1)

SUMMARY

It is thus required that motors serving as a main machine in the electric vehicles have higher characteristics for both generation of larger torque and higher power factors in lower rotation speeds required when the vehicles climb up steeper roads, and generation of weakened field when the vehicles run at higher rotation speeds.

Objects of the present invention are thus to realize a motor and a control apparatus therefor which can obtain larger torque output at higher power efficiencies and which avoid the motor voltage from being excessive in a higher rotation speed range. In parallel, it is also required to make the motor and the control apparatus smaller in size, lesser in weight and lower in manufacturing cost.

In terms of technical configurations, there is provided motors which do not generate an armature reaction, which are able to concentrate magnetic fluxes at the airgap or an area near thereat in the circumferential direction, and which are able to output larger amounts of torque which are much higher than conventional torque values. In addition, there are provided motors whose field magnetic fluxes can be controlled easily, and whose weakened field results in constant output control and whose rotation control is also possible in higher rotation speeds.

In a first exemplary embodiment, the motor and the control device comprise:

a multiple-phase stator windings SW arranged in a stator Sta, the stator windings being arranged in a circumferential periphery of the stator, the circumferential periphery being opposed to a rotor side;

a rotor Rot provided with rotor magnetic poles RP consisting of N- and S-poles;

a rotor winding RW arranged in the rotor, the rotor winding being arranged in a circumferential direction of the rotor at approximately even pitches in a portion close to a circumferential periphery of the rotor magnetic poles RP, the circumferential periphery of the rotor magnetic poles being directly opposed to the stator;

stator current supplying means MSC which supply a current SIG to the stator windings SW;

rotor current supplying means MRC which supply a current RIG to the rotor; and current control means MCC which control the current SIG to the stator windings SW and the current RIG to the rotor winding RW, wherein a flowing direction of the current SIG and a flowing direction of the current RIG are relatively, in part or all of the current, opposite to each other.

This configuration makes it possible to obtain improvement of the power factor, larger amounts of torque output, constant output control performed by weakening the field in a controlled manner, and control of higher speed rotation.

In a second exemplary embodiment, the motor and the control device additionally includes the field winding RFW.

By this configuration, it is easier to magnetically excite the field magnetic fluxes during, particularly, higher-speed rotation of the motor.

In a third exemplary embodiment, the motor and the control device are configured such that the rotor current supplying means MRC comprises a rotary transformer RU or an AC generator AG which supplies the rotor current; and a rectifying device REC1 which rectifies an output AC voltage and an output AC current to a DC rotor current.

In this configuration, the rotor current can be supplied by a simplified structure of the motor, with improved reliability due to contactless current supply.

In a fourth exemplary embodiment, the motor and the control device are configured such that the rotor current supplying means MRC are configured to supply the rotor current based on the current generated by the stator current supplying means MSC and supplied to the stator windings SW.

According to this configuration, the rotor current can be supplied by a simplified structure of the motor.

In a fifth exemplary embodiment, the motor and the control device are configured such that the rotor current supplying means MRC comprises a stator power-supplying winding PSW which excites an AC magnetic flux component, which is present in the stator at pitches, the pitches being defined by multiplying an electrical angle 360 degrees by QN times, the QN being an integer of 2 or more;

a rotor power-receiving winding PRW which receives power for the rotor, the power-receiving winding being arranged in the rotor in a circumferential direction thereof and arranged at pitches, the pitches being defined by multiplying an electrical angle 360 degrees by an integer number; and a rectifying device REC2 which rectifies an AC voltage and an AC current of the received power to a DC rotor current.

In this configuration, the winding structure of the stator can be used partly to supply the rotor current, thus simplifying the motor configuration and improved reliability due to contactless current supply, without using a brush.

In a sixth exemplary embodiment, the motor and the control device are configured such that the current control means MCC are configured to control the currents such that a sum IWSP of torque current components of the stator and a sum IWRM of torque current components of the rotor, the torque current components of the rotor being opposed to the torque current components of the stator via an airgap and energized.

This configuration makes it possible to arbitrarily increase or decrease the field current component to the motor, thus realizing output of larger amounts of torque or faster rotation drive.

In a seventh exemplary embodiment, the motor and the control device are configured such that the current control means MCC are configured to control a current phase θi of the stator to a circumferential position Or of the rotor winding RW.

This configuration makes it possible to arbitrarily increase or decrease the field current component to the motor, thus realizing output of larger amounts of torque or faster rotation drive.

In an eight exemplary embodiment, the motor and the control device are configured such that the current control means MCC are configured to:

control a current phase θi of the stator to a circumferential position θr of the rotor winding RW, wherein the current control means control the current phase by additionally including a field current component SFC of the stator or a field magnetic flux generating means RFC of the rotor depending on a position θr of the rotor winding RW, the field current component SFC and the field magnetic flux generating means RFC being generating a field magnetic flux, or a permanent magnet.

By this configuration, the field current component to the motor can be increased, with reducing the rotor current.

In a ninth exemplary embodiment, the motor and the control device are configured such that the rotary transformer RTT is provided with a stator-side rotary transformer RTS provided with a position sensor SPS which detects a rotor position of the rotor, and the rotary transformer RTT is also provided with a rotor-side rotary transformer RTR provided with a portion which detects a position of the rotor, the portion including a portion having a small magnetic resistance and a portion having a magnetic resistance which is larger than the small magnetic resistance.

This configuration makes it possible to detect a rotor rotation position using a part of the rotary transformer RTT supplying the rotor current.

In a tenth exemplary embodiment, the motor and the control device are configured such that the motor and the control device comprises: power supplying means MSP which supply power to the rotor, the power supplying means MSP being a part of the rotor current supplying means MRC; and current control means RCC which is a part of the rotor current supplying means.

This configuration enables more accurate supply of the rotor current and faster control of the rotor current.

The motor according to the present disclosure has features as follows. No armature reaction is caused, or the armature reaction can be greatly reduced. Circumferential magnetic fluxes can be concentrated at the airgap or a portion near to the airgap, thus a magnetic flux density is higher in the airgap or the portion near to the airgap in the circumferential direction. Accordingly, torque whose amount is much larger than the conventional motor can be outputted, and a greater motor output density can also be provided. In addition, field weakening control can be performed more accurately and reliably, thereby realizing higher-level constant output control of the motor. Concretely, the motor voltage can be controlled so as not to allow the motor voltage to be excessive in a high rotation range of the motor, to improve both a power factor in the high rotation range and torque output. Accordingly, such advantages can contribute to high performance, more compact design, weight saving, and/or lower-cost manufacturing of products such as motors for main machines mounted in electric vehicles EV. Additionally, in a higher rotation speed range, the field winding is helpful for stabilizing the magnetic field fluxes, thus increasing the power factor of the stator currents.

DETAILED DESCRIPTION OF THE PREFERRED EMBODIMENTS

Figure 1:
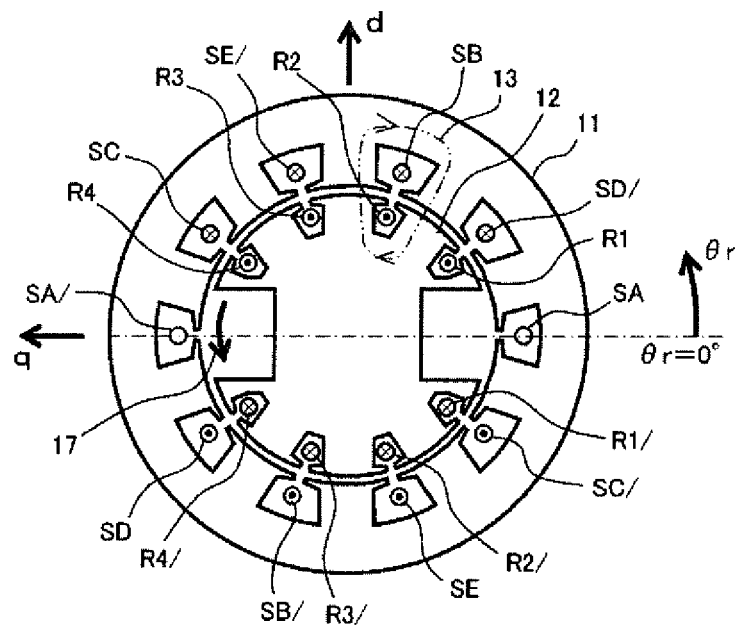
FIG. 1 is a lateral sectional view exemplifying the configuration of a motor according to the present invention.

FIG. 1 shows a lateral sectional view of a motor provided according to the present invention, which is practiced as exemplary embodiments having various configurations.

There is provided a two-pole synchronous motor in which a reference number 11 indicates a stator and a reference number 12 indicates a rotor. The stator has ten slots and the rotor also has ten slots. The stator has concentrated windings which are composed of five-phase and full-pitch windings. A reference symbol SA indicates an A-phase winding of the stator, which is a part of a circulated winding which is also wound as a winding SA/ located on the 180-degree opposite side of the stator to the winding SA, such the A-phase windings are wound at pitches defined by an electrical angle of 180 degrees in the circumferential direction. To the winding SA, an A-phase current Ia is supplied, so that an oppositely directed current −Ia flows through the winding SA/. In the similar way to this, a reference symbol SB indicates a B-phase winding of the stator to which a B-phase current Ib is supplied, so that an opposite-side winding SB/ is subjected to supply of −Ib, which is circulated through both the B-phase windings. A reference symbol SC indicates a C-phase winding of the stator to which a C-phase current Ic is supplied, so that an opposite-side winding SC/ is subjected to supply of −Ic, which is circulated through both the B-phase windings. A reference symbol SD indicates a D-phase winding of the stator to which a D-phase current Id is supplied, so that an opposite-side winding SD/ is subjected to supply of −Id, which is circulated through both the C-phase windings. A reference symbol SE indicates an E-phase winding of the stator to which an E-phase current Ie is supplied, so that an opposite-side winding SE/ is subjected to supply of −Ie, which is circulated through both the E-phase windings.

Supply currents to the stator windings of the motor according to the present invention can be realized by various driving methods, which include a driving method which uses sinusoidal-wave voltages and currents, a driving method which uses rectangular-wave voltages and currents, and a driving method which uses trapezoidal-wave voltages and currents. First, how to drive using five-phase trapezoidal-wave voltages and currents will now be described. Although a three-phase sinusoidal-wave driving method is a mainstream driving method in the motor control technique available currently, it is apparent that use of multi-phase rectangular AC voltage and current, such as five-phase or seven-phase ones, in driving an AC motor will be better in terms of increasing power efficiency of a motor and making an inverter size smaller, which will provide a novel possibility which is different from the sinusoidal-wave driving.

Figure 6:
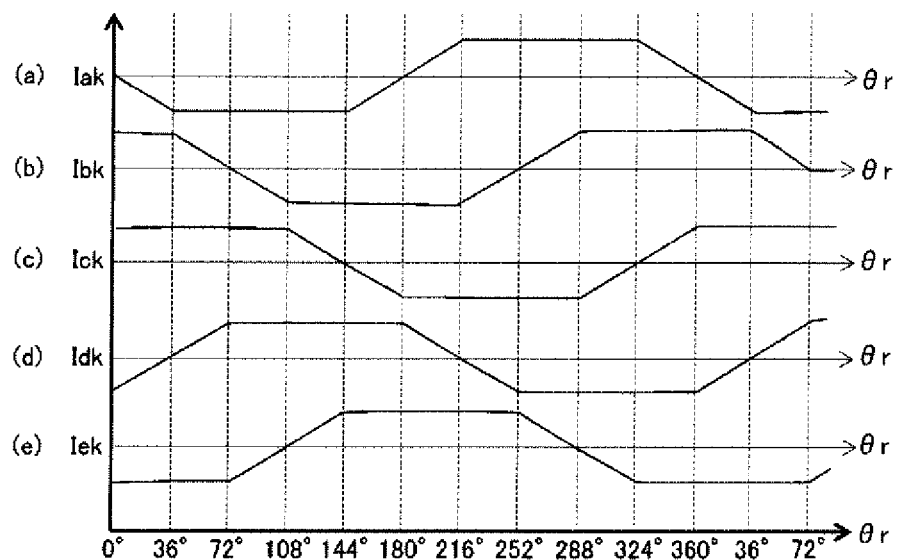
FIG. 6 is a diagram explaining motor drive using trapezoidal currents supplied.

The motor shown in FIG. 1 is an AC motor, in which current values in each of the phases of the motor becomes positive and negative values alternatively in sequence, thereby providing a timing at which the current value is zero. When it is assumed that a rectangular-wave current for the driving has a current amplitude of Imax, the current will change from its value +Imax to −Imax in a moment, so that it will not be impossible to control the current at a high speed which makes it negligible a time duration down to a current zero. However, with this technique, the motor will have drawbacks such as ripples in the torque, vibration, noise, and/or power loss. Here will now be exemplified trapezoidal-wave currents each having a current amplitude Imax. For instance, as illustrated in FIG. 6, trapezoidal-wave currents Ia, Ib, Ic, Id and Ie have current waveforms Iak, Ibk, Ick, Idk and Iek, respectively. The abscissa axis represents electrical angle of the rotation angle θr of the rotor.

In the present embodiment according to the present invention, there are shown symbols indicating the respective windings, in which a current symbol with x-marks at windings which pass from the front to the rear of the drawing paper will be referred to as positive currents. Contrastingly, currents passing from rear to the front of the drawing paper, which flow in windings, will be referred to as negative currents. These symbols are used in general, which are shown for an easier understanding.

Now, in a state shown in FIG. 1, phase windings located in an upper half side of the stator are aligned in the order of SA, SD/, SB, SE/and SC in the circumferential direction, whereby current passing those windings are in the order of Ia, −Id, Ib, −Ie, and Ic. When a rotor current is Ir, relationships of the following formulae can be provided.

$$-Id=Ib=-Ie=Ic=Ir \quad (1)$$

$$Ia=0 \quad (2)$$

$$Ia+Ib+Ic+Id+Ie=0 \quad (3)$$

The currents of the respective phase windings belonging to the upper half side of the stator in the drawing are all positive currents. The formula (3) shows a sum of such positive currents. Such positive currents in FIG. 1 correspond to respective phase current values at the rotor rotation angle θr=0 degrees in FIG. 6. On the other hand, phase windings located in a lower half side of the stator of FIG. 1 are aligned in the order of SD, SB/, SE and SC/ in the circumferential direction, whereby currents passing through those windings are in the order of Id, −Ib, Ie, and −Ic, which are all negative currents which pass through the phase windings located in the lower half side of the stator in the drawing.

The rotor 12 can be rotated freely in its circumferential directions. The rotor rotation position θr in FIG. 1 is 0 degrees. When the rotor rotates in the counterclockwise rotation direction CCW, the value of the rotational position θr increases. The motor is explained as a two-pole motor, so that the rotational position θr becomes θr=180 degrees when being rotated by a half turn in the direction CCW. In the state shown in FIG. 1, the windings of the stator and the windings of rotor are directly opposed to each other via an airgap. Currents supplied to the rotor windings are opposite in their directions to currents supplied to the stator windings which are opposed to the rotor windings. To a rotor winding R1, a rotor current −0.5×Ir is supplied, while to the rotor winding R1/, a rotor current 0.5×Ir is supplied, which means that those currents take a round. To a rotor winding R2, a rotor current −Ir is supplied, while to the rotor winding R2/, a rotor current Ir is supplied, which means that those currents also take a round. To a rotor winding R3, a rotor current −Ir is supplied, while to the rotor winding R3/, a rotor current Ir is supplied, which means that those currents also circulate. To a rotor winding R4, a rotor current −Ir is supplied, while to the rotor winding R4/, a rotor current Ir is supplied, which means that those currents also circulate.

Since each of the currents in the respective slots is given by a product defined by "supplied current×the number of winding turns", design for both the supplied current and the winding turn number can be changed so as to make each slot current equal to the product. In addition, the degree of freedom of winding connections is higher. Hence, connections of the windings to which the same amount of current is supplied can be changed with each other. In addition, an easier method of turning the windings or a method of reducing turns of windings at coil end portions can be employed.

In the configuration shown in FIG. 1, the stator has 10 slots and the rotor has 8 slots. However, since trapezoidal-form slot currents shown in FIG. 6 are supplied, the number of slot currents in the stator is eight which is the same as those in the rotor. In the state of θr=0 degrees, the stator slots and windings wound in the respective stator slots are directly opposed to the rotor slots and windings wound in the respective stator slots via the airgap provided between the stator and rotor. In the state shown in FIG. 1, the stator windings and the rotor windings, which are directly opposed to each other, are subjected to receiving currents whose amplitudes are equal to each other but whose directions are opposite to each other.

In detail, the stator winding SB receives a current Ib flowing through a direction from the front to the rear of the drawing paper, the rotor winding R3 receeves a current Ir flowing through a direction from the rear to the front of the drawing paper, in which the current amplitudes are Ib=Ir. Hence, an integral of strength H of a magnetic field around a path of a magnetic flux shown in a two-dot chain line becomes zero according to Ampere's law, because the currents passing through the windings providing this path are cancelled out to be zero. 30o That is, the magnetic flux 13 has a component of zero. This is true of the other rotor windings which are opposed to the their stator windings via the airgap, whereby the magnetic fluxes of the whole motor whose rotational position is shown in FIG. 1 become zero. Athrough magnetic fluxes are genrateded locally around the currents, there is no substantial effect on the motor as a whole. In the rotational state shown in FIG. 1, field magnetic fluxes are not generated, and the motor does not generate torque. The motor shown in FIG. 1 represents a basic rotational position for the sake of explaining motor rotations shown in FIG. 2 and thereafter.

As the next step, the phases and energized states of stator currents are defined as to the rotor rotation position θr, and the phase state shown in FIG. 1 is defined as a stator current phase θi=0 degrees. Concerning the direction of the current phase, a clockwise direction CW thereof is defined as a positive direction and expressed by an electrical angle. In the respective windings of the stator, circumferential electrical angle positions in the counterclockwise rotation direction are provided as 0 degrees at the A-phase winding, 72 degrees at the B-phase winding, 144 degrees at the C-phase winding, 216 degrees at the D-phase winding, and 288 degrees at the E-phase winding. Control angles (angles to be controlled) for the respective phases of the stator currents are:

control angle of A-phase stator current:
$$\theta a=-0°-\theta i+\theta r \quad (4)$$

control angle of B-phase stator current:
$$\theta b=-72°-\theta i+\theta r \quad (5)$$

control angle of C-phase stator current:
$$\theta c=-144°-\theta i+\theta r \quad (6)$$

control angle of D-phase stator current:
$$\theta d=-216°-\theta i+\theta r \quad (7)$$

control angle of E-phase stator current:
$$\theta e=-288°-\theta i+\theta r \quad (8)$$

Figure 2:
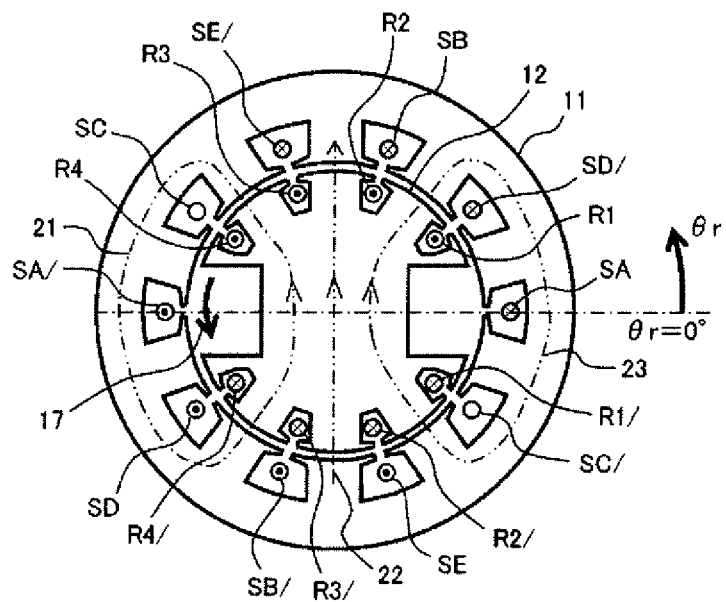
FIG. 2 is a lateral sectional view exemplifying the configuration of a motor according to the present invention.

FIG. 2 illustrates a state in which the current phase θi is 36 degrees and, compared with that shown in FIG. 1, the stator current distribution is offset by 36 degrees in the clockwise rotation direction CW. As can be understood from the state shown in Fi. 1, a current Ia of the A-phase winding SA is changed from 0 to Ir and a C-phase current Ic of the C-phase winding SC is changed from Ir to 0. An E-phase current Ie of the E-phase winding SE is −Ir, a B-phase current Ib of the B-phase winding SB is Ir, and a D-phase current Id of the D-phase winding SD is −Ir, which are not changed. In addition, the rotor rotation position θr shown in FIG. 2 is the same as that shown in FIG. 1 in which the rotor rotation position θr is 0 degrees, thus providing no changes in the rotor currents Ir. The control angles for the respective phase currents are expressed by the foregoing formulae (4), (5), (6), (7) and (8). Incidentally, FIG. 6 shows characteristics provided at the current phase $\theta i=0$ degrees, so that the respective phase currents shown in FIG. 2 provide characteristics which can be realized by moving the current waveforms of FIG. 6 to the right by angles of 36 degrees in the drawing.

In addition, for example, there is a case where the rotor is rotated from the position shown in FIG. 2 such that the rotor rotation position $\theta r$ increases from 0 degrees by an amount of $\Delta\theta r$, in which the rotation is controlled at a current phase $\theta i=36$ degrees which is shown in FIG. 2. In this case, changes in the control angle $\theta a$ of the A-phase stator current comply with the formula (4), that is, changes from $(-0°-36°+0°)=-36$ degrees to $(-0°-36°+\Delta\theta r)$ for the control. This change is true of control angles $\theta b$, $\theta c$, $\theta d$, and $\theta e$ of the other phase currents.

Moreover, respective directions radially viewing from the center of the motor, which can be shown for example in FIG. 1, are defined as a motor angle $\theta z$, as shown in FIG. 2. Specifically, a motor angle $\theta z=0$ degrees is set along the right-side horizontal direction from the center of the motor in the drawing of FIG. 2, a motor angle $\theta z=90$ degrees is set in the upper side in the drawing, and a motor angle $\theta z=180$ degrees is set along the left-side horizontal direction from the center of the motor in the drawing.

In the state of FIG. 2, the rotor rotation position $\theta r$ is 0 degrees and the current phase $\theta i$ is 36 degrees, which generates field current components for field magnetic fluxes. Those field current components are the current Ir of the stator winding SA, the current Ir of the rotor winding R1/, the current −Ir of the stator winding SA/, and the current −Ir of the rotor winding R4.

These four current components 2×Ir, which are composed of the two sets of windings, serve as the field current components which generate magnetic fluxes 21, 22, 23 shown by two-dot chain lines. In the case of the current phase $\theta i=0$ shown in FIG. 1, the respective stator currents and the mutually opposed rotor currents are cancelled out with each other, whereby the field current components are zero. Furthermore, in a case where the current phase $\theta i$ is 72 degrees, field current components of "4×Ir" are generated. In this way, depending on amounts of the current phases $\theta i$, the generated field current components are changed.

In addition, the winding SE/ shown in FIG. 2 is supplied with the current Ir and the winding R3 is supplied with the current −Ir, thereby causing a sum of the currents passing through these two windings to be zero, thereby generating no magnetomotive force to the outside. In the same way, a sum of the currents of the winding SB and R2, a sum of the currents of the windings SD/ and R1, a sum of the currents of the windings R2/ and SE, a sum of the currents of the windings R3/ and SB/, and a sum of the currents of the windings R4/ and SD are also zero. Namely, the currents of both-side windings wound in the mutually opposed stator and the rotor cancel out their mutual magnetomotive forces, thus causing no magnetic influence therearound.

However, in this case, the currents of the stator windings SE/, SB, SD/, SE, SB/ and SD interact electromagnetically with the field magnetic fluxes 21, 22 and 23, thereby generating torque Tss in the CCW direction relatively to the field magnetic fluxes. It can thus be regarded that the field magnetic fluxes 21, 22 and 23 intervene between the torque Tss and the torque Trr so that torque is generated based on an action and reaction relationship. In the present embodiment, the currents which generate the torque Tss and Trr are referred to as torque currents. Hence, when the stator is fixed, the torque Trr in the CCW direction is generated and acts on the rotor 12. This action and reaction relationship are required by a basic configuration that generates the torque but does not cause the armature reaction.

As described, by changing the phases ei of the stator currents, the field magnetic fluxes can be increased or decreased. In FIG. 2, the current components of both stator currents and rotor currents excite the field magnetic fluxes. In contrast, many of the conventional motors have field current components in either the stator or the rotor. In consideration of the conventional field current components, the foregoing excitation structure of the present embodiment is one of the features of the present invention.

As described, the winding currents which generate the torque are opposed to each other via the air gap, so that the two currents of which directions are opposed to each other are able to cancel magnetomotive forces out. As explained with FIGS. 1 and 2, a magnetomotive force will not be generated outside the two currents (windings). Namely, there is provided an effective advantage that the respective torque current components will not cause the armature reaction. The foregoing theoretically shows that, for example, even when motor currents having amplitudes which are 100 times larger than a constant rating current are supplied, it is possible to make the motor generate large amounts of torque, with the field magnetic fluxes still maintained at appropriate quantities by controlling the current phase $\theta i$. On the other hand, however, as will be described later, discreteness of the stator slots and the rotor slots still influences ripples in the torque, although the motor configuration shown in FIGS. 1 and 2 is simplified in its structure for the sake of a simplified explanation. An actual motor has some limitations in the structure. These issues can be improved effectively using various solutions of the discreteness depending on objectives.

As described with FIG. 1, it is possible to cancel out magnetomotive forces which influence the outside when currents passing through windings of the stator are opposed to currents passing windings of the stator. As long as this structure is employed, various types of methods for exciting the field magnetic fluxes can be used. Although they will be described later, such methods include a method of providing the stator with field excitation current components, a method of providing the stator with permanent magnets, a variable-magnet method of varying the strength of the permanent magnets using currents for magnetization and demagnetization, a method of providing slits, a method of arranging the slits and permanent magnets closely to each other, and a method of providing the rotor with a shape having a salient-pole structure. These methods can also be used in a combination thereof.

In the description of the present invention, the current passing in each of the slots indicates a product [A·Turns] between the current passing through the winding in that slot and the number of winding turns. For example, a case where the winding current is 5 [A] and the number of winding turns in each slot is 20 is equivalent to a case where the winding current is 10 [A] and the number of winding turns in each slot is 10. In addition, the current passing through each of the windings in each slot is composed of a field current component and a torque current component which are combined to pass through each winding arranged in each slot other than slot positions where the stator slots and the rotor slots are exactly opposed to each other, as shown in FIGS. 1 and 2.

The rotor shown in FIGS. 1 and 2 provides a smaller amount of magnetic resistance in the vertical direction in the drawings and a larger amount of magnetic resistance in the horizontal direction in the drawings. Accordingly, the rotor shape provides a magnetically salient-pole performance, so that it is easier to stabilize the magnetic direction of the field magnetic fluxes in controlling the motor currents. It is also possible to change how to supply the currents such that reluctance torque is generated. In the foregoing qualitative descriptions concerning with FIGS. 1 and 2, the expressions of "the field current components and the torque current components" have been used but are not so strict in a quantitative sense. For a strict quantitative analysis, it is effective to perform a computer analysis based on for example an electromagnetic finite element method to obtain relationships among or between current, voltage, torque and other factors.

Figure 3:
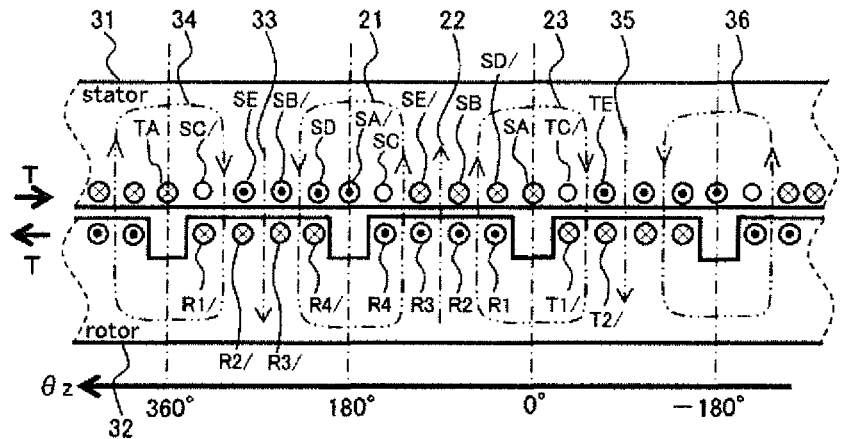
FIG. 3 is a linearly developed view exemplifying the configuration of a motor according to the present invention.

For an easier understanding of a relationship among the motor elements, FIG. 3 shows a development view in which the cylindrical motor of in FIG. 2 is developed linearly. In this view, the motor shown in FIG. 2 is modified to a four-pole motor and details a range from a motor angle $\theta z=0$ degrees to $\theta z=360$ degrees. Further, a rotor rotation position $\theta r$ is 0 degrees and a current phase $\theta i$ is 36 degrees. Slots shown in FIG. 2 are omitted from being drawn. Wave-shaped broken lines mean that both outsides of the range are omitted from being drawn. In FIG. 3, the windings are given the same reference numbers as those shown in FIG. 2. That is, a reference number 31 shows a motor, a reference number 32 shows a rotor, and an airgap is formed therebetween. The range of the motor angles $\theta z=0$ degrees to 360 degrees corresponds to the configuration shown FIG. 2. As explained with FIG. 2, the currents of windings such as the windings SA, T1/, SA/ and R4 include the field excitation current components which excite the field magnetic fluxes 21, 22, 23, 33, 34, 35 and 36, and other fluxes shown by two-dot chain lines. Currents passing through the other windings are current components for generating torque. Torque T acting to the right side in the drawings is applied by torque current components of the stator 31, while torque T acting to the left side in the drawings is applied by torque current components of the rotor 32. Both of the torque T act relatively to each other via the field magnetic fluxes.

Figure 4:
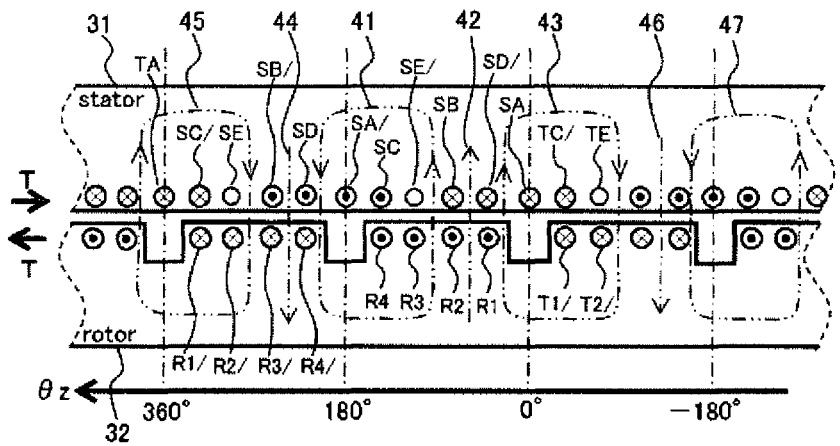
FIG. 4 is a linearly developed view exemplifying the operations of a motor according to the present invention.

FIG. 4 is an example showing a configuration in which the current phase $\theta i$ of FIG. 3 is increased from 36 degrees to 72 degrees. The currents passing through the windings including the windings SA, TC/, T1/, T2/, and SA/, SC, R4, R3 include the field excitation current components. These current components are increased two times larger than those shown in FIG. 3. At least, reference numbers 41, 42, 43, 44, 45, 46 and 47 show field magnetic fluxes. In this example, the field current components are increased by increasing the current phase $\theta i$ to 72 degrees. In a motor operating region in which load to the motor is relatively lower and current amplitudes are smaller, the current phase $\theta i$ may be made larger so as to raise a ratio of the field magnetic flux current components. Such a method will raise the torque, which improves an efficiency of power of the motor.

In the next example, an issue of discreteness, which is due to the number of slots formed in the stator and the rotor, and a solution to the issue will now be described. In the example of FIGS. 1 and 2, the number of slots of the stator is 10 and the number of slots of the rotor is also 10. This is a selected motor model, because this makes it easier to theoretically explain the present invention. FIG. 1 shows a current phase $\theta i=0$ degrees, FIG. 2 shows a current phase $\theta i=36$ degrees, and FIG. 4 shows a current phase $\theta i=72$ degrees, at each of which the rotor rotation position $\theta r=0$ degrees. When the current phase $\theta i$ and the rotor rotation position $\theta r$ are equal to the integral multiple of 36 degrees, drawing and explaining changes of such current phase and the rotor rotation position are easier.

In the configuration shown in FIGS. 1 and 2, the slots of both stator and rotor are arranged at a pitch of 36 degrees, which is larger in the sense of discreteness. Hence, larger ripples in the torque may occur. Additionally, linearity between the current phase $\theta i$ and the field magnetic flux amplitudes may be degraded. One solution to this discreteness issue is to increase the number of phases. Although FIGS. 1 and 2 exemplify the five-phase stator, three- and four-phase stators can be available and the number of phases can be increased up to higher phases, such as six, seven, nine and eleven phases. By increasing the number of rotor slots and by arranging those slots at equal pitches in the circumferential direction, the discreteness can be decreased favorably. Additionally, skewing the stator and the rotor enables the discreteness to be lowered. As performed with induction motors, the number of rotor slots may be set to be different from the number of stator slots. This is also able to reduce the discreteness due to an averaging effect. In FIGS. 1 and 2, the stator windings are would in the full-pitch and concentrated winding manner, but may be wound in a distributed winding manner, thereby lowering the discreteness. Alternatively, a short-pitch winding method may be applied to the distributed windings, thereby further decreasing the discreteness. Incidentally, when either the stator or the rotor has a reduced discreteness, it is still possible to reduce the effect of discreteness on a whole motor characteristic. In a practical design of the motor according to the present invention, it is effective that the foregoing various countermeasures are selected properly, including selection of the number of phases.

In particular, when selecting the five or more places, it is noted that the discreteness is greatly decreased, and the torque ripples are also lowered greatly, thus easily obtaining the effects of the present invention and securing quality of the motor. In addition, though the foregoing embodiment has been explained with one type of rotor current Ir, two or more types of rotor currents can be provided to the rotor. In such a case, however, configurations for supplying the rotor currents and drive circuits become complex in their structures. In contrast, such a case gives a higher degree of freedom in supplying the rotor currents, thus being combined with the respective phase currents of the stator in various ways. This is highly effective in changing field magnetic flux distributions and improving distributions of torque current components.

In addition, in order to avoid or suppress occurrence of the armature reaction, it is enough that a sum IWSP of the torque current components on the positive side of the stator equals to a sum of IWRN of the torque current components on the negative side of the rotor, and controlling such currents so as not to generate magnetomotive forces therearound, which can be based on the following formula:

$$(IWSP-IWRN)=0 \qquad (9)$$

In this formula, IWSP and IWRN denote current components which are approximately opposed to each other via the airgap and are opposite to each other in their passing directions.

In the motor shown in FIGS. 1 and 2, which is for explaining the principle, the formulae including (1), (2) and (3) have been used for the explanation. Meanwhile, practical motors have only one transition state at which both slots of the stator and rotor are directly opposed to each other via the airgap and, at most of the transition states, the slots on both sides are not directly opposed to each other. Moreover, even when the slots are nearly opposed to each other, it is often found that the currents in both side slots do not the same amplitudes, i.e., are different slot by slot. In designing a motor, to reduce the issue due to the discreteness, mutually different prime numbers are included in the number of slots of the stator and the number of slots of the rotor, thereby reducing issues such as torque ripples. In this case, the foregoing definition of "the slots are substantially opposed to each other and the current components IWSP and IWRN are opposite to each other in its directions" become ambiguous, which ambiguity level is almost the same as use of d- and q-axis currents, as we say, in the dq axis theory.

For example, when the number of stator slots is 14 and the number of rotor slots is 22, it is difficult to directly compare values of currents passing through the respective slots of the stator with those passing through the respective slots of the rotor, and in this case, the formula (9) is suitable. In FIG. 2, the sum IWSP is 3×Ir provided by the stator windings SA, SD/, SB and SE/. In this case, the sum −IWRN is −3×Ir provided by the rotor windings R1, R2, R3 and R4.

Additionally, in the present invention, for each phase, the stator current is defined as a sum of a torque current component and a field current component. The stator torque current components IWSP have the same value of the rotor torque current components IWRN which are approximately opposed to the stator torque current components IWSP via the airgap but are opposite to each other in their directions. Accordingly, a sum "IWSP−IWRN" of both torque current components can be regarded as a generic term of the current components which will not generate a magnetomotive force in other parts of the mother and will not affect magnetically the field magnetic fluxes. On the other hand, currents other than the torque current components can be provided as field current components, and contribute to the amplitudes and distributions of the field magnetic fluxes. The field current components generate torque depending on a particular distribution of the field magnetic fluxes, and it is noted that the torque current components and the field current components are not strictly separated from each other.

As used in explanations with FIGS. 1 to 5, the currents provided by the torque current components IWSP and IWRN and field current components can also be defined by using current phase θi and current amplitude Ims. Such a definition can be employed when the stator current amplitude Ims and the rotor current amplitude Imr are qual to each other. In other words, in the motor according to the present invention, the field current components can be said to be such that the stator-side field current components Ifs and the rotor-side field current components Ifr are not always the same value.

As one of solutions to this mismatch, the rotor-side field current components Ifr are defined as follows:

$$Ifr = Ifs + Ifrx \qquad (10),$$

wherein Ifrx denotes a difference between a stator-side field current component Ifs and a rotor-side field current component Ifr, so that the difference Ifrx indicates an imbalanced field current component. This differential field current component Ifr can be treated by another control manner, whereby the motor currents can be expressed based on the current amplitude Ims and the current phase θi. From the values of the current phase θi, a ratio between approximate field current components and torque current components can be recognized for the control. As will be described later with FIG. 9 and its explanations, a characteristic diagram showing the current phase θi and the torque T can be produced.

As the method for controlling the magnitudes of the field magnetic fluxes, controlling the current phase θi has been explained. Instead of this, the amplitude of the current can be controlled. Since the motor voltage is proportional to a product of the magnitudes of the field magnetic fluxes and the number of rotations, it is necessary to control the field magnetic fluxes depending on drive conditions of the motor. Particularly, in a high-speed rotation range, the field should be weakened so that the field magnetic fluxes should be smaller in a controlled manner. Weakening the field will be explained later.

Figure 5:
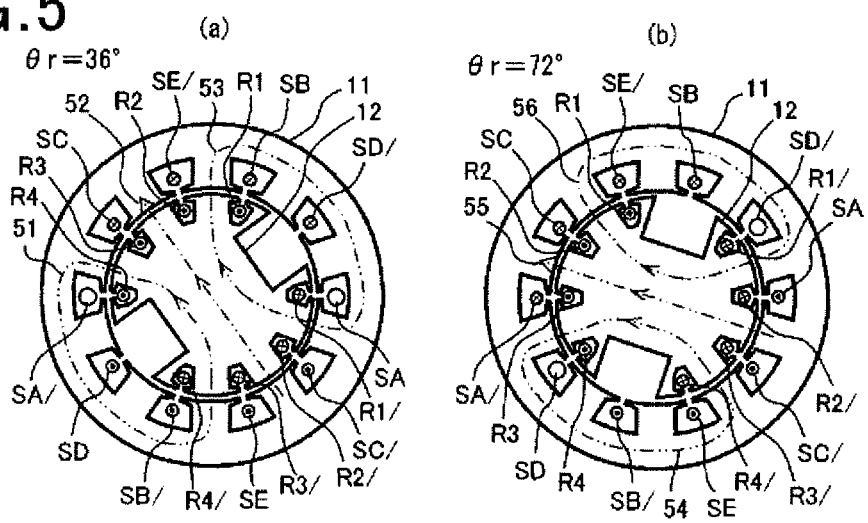
FIG. 5 is an illustration explaining rotational operations of a motor.

FIG. 5 exemplifies various motor sections, which are provided by rotation of the motor shown in FIG. 2. This example is provided at a current phase θi of 36 degrees. FIG. 2 shows that a rotor rotation position or is 0 degrees and the direction of field magnetic fluxes is shown by a magnetic flux 22. In a part (a) of FIG. 5, the rotor rotation position θr is 36 degrees and the direction of the field magnetic fluxes is shown by a two-dot chain line 52. In a part (b) of FIG. 5, the rotor rotation position θr is 72 degrees and the direction of the field magnetic fluxes is shown by a two-dot chain line 55. At these rotation positions, the amount of the rotor current Ir is constant, while the windings of the rotor are subjected to passing of constant currents when the rotor rotates. In parallel, during the rotation of the rotor, the phase currents of the stator are controlled based on the foregoing formulae (4) to (8) such that the stator currents can maintain the relative same relationship with the respective currents of the rotor, that is, the current phase θi of 36 degrees can be maintained. Since FIG. 6 shows the respective phase-current waveforms obtained at the current phase θi of 0 degrees, the phase is delayed by 36 degrees to reach the current phase θi of 36 degrees. In other words, when the respective current waveforms are moved by 36 degrees rightward in FIG. 6, the current waveforms of the respective phases shown in the part (a) and (b) of FIG. 5 can be realized.

A third exemplary embodiment will now be explained.

Figure 7:
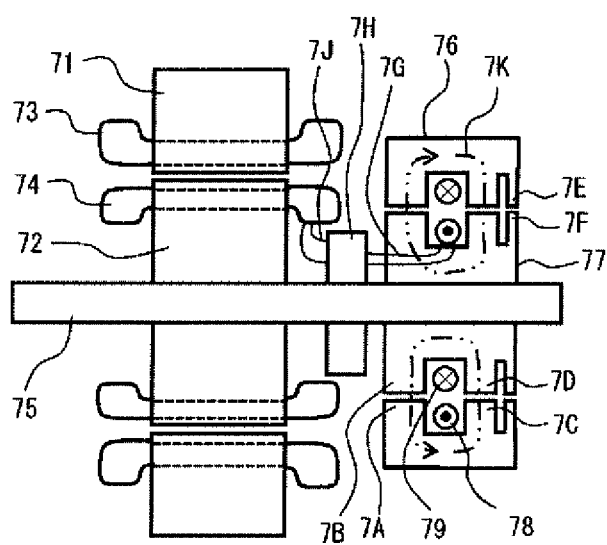
FIG. 7 is an axial sectional view exemplifying the configuration of a motor according to the present invention.

FIG. 7 exemplifies a configuration which supplies a rotor current Ir by using a rotary transformer, in which this configuration also outlines longitudinal sections of the motor shown in FIGS. 1, 2 and other drawings.

A reference number 71 shows a stator, a reference number 72 shows a rotor, a reference number 73 shows coil end portions of stator windings, a reference number 74 shows coil end portions of rotor windings, and a reference number 75 shows a rotor shaft. A reference number 76 shows a rotary transformer which transmits power necessary to supply the rotor current Ir, from a driver to the windings 74 of the rotor 72. A reference number 7A shows a stator of the rotary transformer, a reference number 7B shows a rotor of the rotary transformer. The rotary transformer is shaped by converting the section shown in FIG. 7 into a cylindrical form. A reference number 78 shows a stator-side winding provided in a circular form in the rotary transformer. A reference number 79 shows a rotor-side winding provided in a circular form in the rotary transformer. When current is supplied to the stator-side winding 78 in a direction illustrated by a symbol shown, a magnetic flux is generated in a direction shown by a two-dot chain line 7K. A reference number 7H shows a rectifying circuit and a reference number 7G shows connecting lines from the rotor-side winding of the rotary transformer. The output of the rectifying circuit 7H is connected to the rotor winding 74 via connecting liens 73, so that the rotary current Jr is supplied.

In FIG. 7, for the sake of a simplified and easier understanding, the rotary transformer 76 is drawn by being exaggerated in its size and structure. By the way, power supplied to the rotor is mainly consumed as resistive loss of the rotor winding, and is smaller compared with a motor output. Besides, when the rotary transformer 76 is driven by a high-frequency AC voltage of a frequency of 100 kHz or more, the rotary transformer can be provided with a smaller-size core, windings with lesser turns, and a more compact size, such as a transformer installed in a switching regulator power supply. For example, when the rotor has a diameter of about 150 mm and multiple poles such as 8 poles, there is a space close to a radially inner outer surface of the rotor. Hence, the rotary transformer 76 and the rectifying circuit 7H can be arranged in such a space. In that arrangement, the rotor 72 of the motor and the the rotor 7B of the rotary transformer can be united if the radially outer portion of the stator 7A and the radially inner portion of the rotor 7B are switched to each other. This is advantageous in protecting the rotor-side winding 79 of the rotary transformer from being subjected to the centrigural force. It is preferred that magnetic members used by the rotary transformer are formed of materials such as amorphous, silicon, or thin iron core, to avoid the iron loss from being too excessive. This is also advantageous in producing a compact rotary transformer. The rotary transformer 76 is magnetically excited in the rotor shaft direction, so that non-magnetic members can be used partly, thus being an effective countermeasure.

Figure 24:
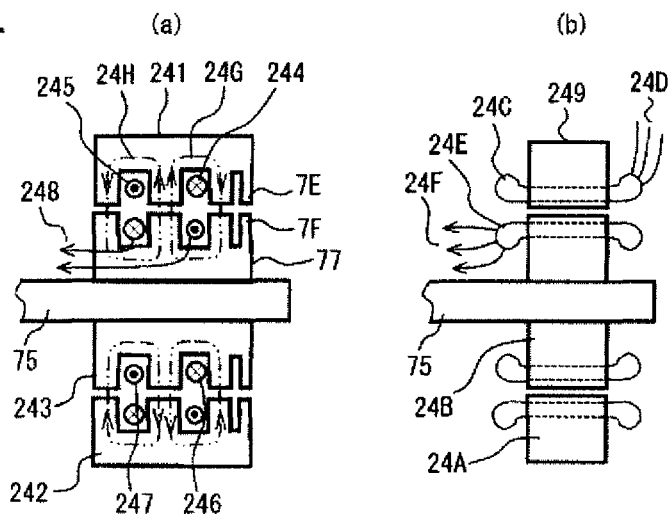
FIG. 24 shows axial illustrations exemplifying a rotary transformer and a generator, respectively.

A part (a) of FIG. 24 exemplifies a rotary transformer 241 which is one of solutions to a magnetomotive force generated in the rotor shaft direction in the rotary transformer 76 shown in FIG. 7. A reference number 242 shows a stator of the rotary transformer, a reference number 243 shows a rotor of the rotary transformer. This rotary transformer 76 has a cylindrical shape produced based on the section of the part (a) of FIG. 24. Reference numbers 244 and 245 shows stator-side windings of the rotary transformer, and these windings are connected in series but oppositely to each other and each are shaped into a circular form. Further, reference numbers 246 and 247 show rotor-side windings of the rotary transformer, also connected in series but oppositely to each other. An output line 248 is electrically connected to the rectifying circuit 7H of FIG. 7. The rotor-side windings 246 and 247 each are shaped into a circular form. When supplying stator-side windings 244 and 245 with currents in the directions shown by shown current flowing symbols, magnetic fluxes 24G and 24H are generated in directions 7K shown by two-dot chain line. Employing the configuration shown in the part (a) of FIG. 24 makes it possible to cancel out axial magnetomotive forces generated along the rotor shaft 75, thus being no magnetomotive force generated and no adhesion of iron powder from the surroundings.

In the configuration shown in the part (a) of FIG. 24, employed is a two set of circular windings mutually connected in series but in the mutually opposite directions, to which the same AC power is supplied. An alternative to this connection is that the two windings are prepared as two-phase windings. In such a case, connections of the two phase windings to the rectifying circuit 7H and the rectifying circuit itself should be adjusted. Three sets of circular windings (shown in FIG. 24, part (a)) and iron cores can be prepared to make a three-phase AC rotary transformer. In this case, it is also necessary to adjust connections to the rectifying circuit 7H and change the rotary transformer to a three-phase rectifying circuit.

A part (b) of FIG. 24 exemplifies a generator 249 which can be used in place of the rotary transformer 76 of FIG. 7. In this generator, a refence number 24A shows a stator and a refence number 24C shows three-phase windings having input lines 24D to which three-phase voltages and currents are supplied. A reference number 24B shows a rotor and a reference number 24E shows three-phase windings having output lines 24F electrically connected to the rectifying circuit 7H shown in FIG. 7. In this case, the rectifying circuit 7H is provided as a three-phase full-wave rectifying circuit. Supplying the input lines 24D with three-phase AC power with constant amplitudes generates rotary field magnetic fluxes in the generator. The generated fluxes have a frequency FFM given by the AC power. When the rotor has a rotary frequency FFR, an output to the output lines 24F has a frequency "FFM-FFR", whereby voltage generated is proportional to "FFM-FFR". The power from the output lines 24F can also be used as a rotor-side three-phase AC power supply to the rotor. Alternatively, by changing amplitudes of the voltages to the input lines 24D, amplitude modulation can be achieved. To the rotor-side output lines 24F, voltages whose frequencies change by an amount of the rotor rotation frequency FFR are supplied. Alternatively, since the generator shown in the part (b) of FIG. 24 generates power as well as positive or negative torque, such generated torque can be utilized as a part of the torque output of the rotor shaft 75. In this generator 249, there is generated no magnetomotive force in the axial direction along the rotor shaft 75. In a similar way as above, other types of generators can be used in the present embodiment and modifications.

Figure 8:
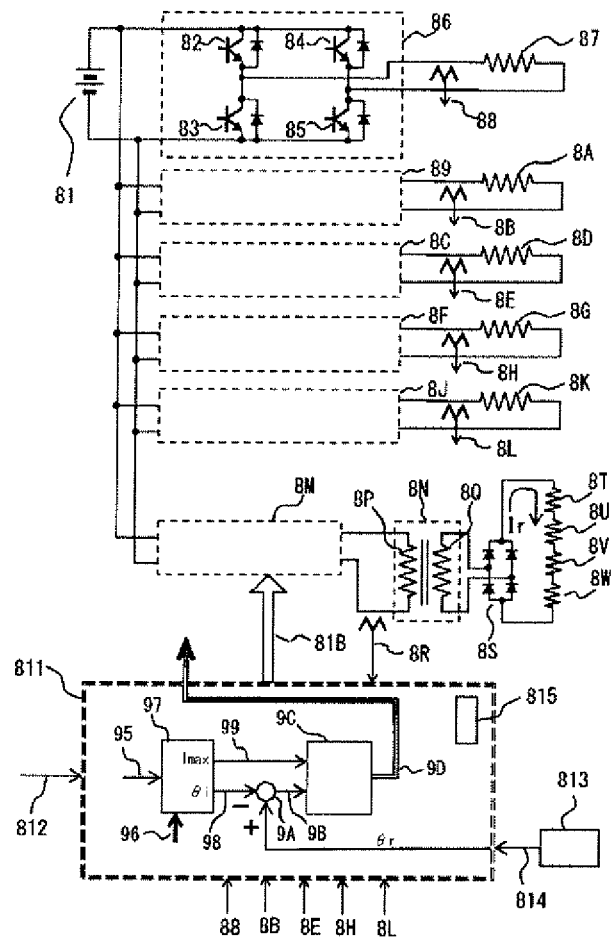
FIG. 8 is a circuit diagram exemplifying a motor and a control apparatus therefor according to the present invention.

FIG. 8 exemplifies a driver which supplies currents and voltages to the windings of the motor according to the present invention, in which the motor is shown in figures including FIGS. 1 and 2.

A reference number 81 shows a DC power supply and a reference number 87 shows an A-phase winding which corresponds to the windings SA and SA/shown in FIG. 1. A reference number 88 shows a current detecting means to detect the A-phase current Ia shown in FIG. 1. Reference numbers 82, 83, 84 and 85 each show a power converting element such as a transistor, which applies PWN control to the current of the A-phase winding 87 for the drive thereof, of which controlled current is a positive or negative value. A reference number 86 indicates four transistors, and reference numbers 89, 8C, 8F, 83J, and 8M are power driving units having the same function as that of the four transistors 86. A reference number 8A shows a B-phase winding which corresponds to the windings SB and SB/shown in FIG. 1. A reference number 8B shows a current detecting means to detect the B-phase current Ib shown in FIG. 1. A reference number 8D shows a C-phase winding which corresponds to the windings SC and SC/shown in FIG. 1. A reference number 8E shows a current detecting means to detect the C-phase current Ic shown in FIG. 1. A reference number 8G shows a D-phase winding which corresponds to the windings SD and SD/shown in FIG. 1. A reference number 8H shows a current detecting means to detect the D-phase current Id shown in FIG. 1. A reference number 8K shows an E-phase winding which corresponds to the windings SE and SE/shown in FIG. 1. A reference number 8L shows a current detecting means to detect the E-phase current Ie shown in FIG. 1. In addition, as the power converting elements, a semiconductor which uses MOSFET, IGBT, GaN, or SiC, or an integrated element or module can be adopted.

Moreover, a reference number 811 shows a control device which is charge of controlling the driving circuits, in detail, controlling positions, a rotation speed, torque, currents and other factors of the motor. A reference number shows a control command signal which includes a motor position command. A reference number 813 shows a position detecting means of the rotor, and an output 814 of the position detecting means 813 is expressed by a rotor rotation angle θr. The motor position control is carried out such that the rotor rotation angle θr is feed-back controlled to the position command, with which a difference is calculated to obtain a speed command. The motor speed control is carried out such that a temporal differential value of the rotor rotation angle θr is feed-back controlled to the speed command, with which a difference is calculated to obtain a torque command 95.

A reference number 97 indicates a current command generating means which operates based on a torque command 95 and motor spec information 96 in order to obtain a current amplitude Imax, which is numbered 99, a current phase θi and other necessary information. That is, a process is performed by the generating means to provide proper values of the motor torque, a motor voltage, and a motor current. The motor specification information 96 includes a rotor rotation angle θr, a rotor rotation speed, and motor-inherent information shown in FIGS. 9 and 10. A reference number 9A indicates an adder provided to obtain current phase information (−θi+θr).

A reference number 9C indicates a current control means, which is provided to input the current amplitude Imax, the current phase information (−θi+θr), and outputs 88, 8B, 8E, 8H and 8L of the current detecting means in order to perform feed-back control on the respective phase currents. This performance enables the phase currents to have control angles as shown by the formulae (4) to (8). A driving putout 9D is thus outputted to have the transistors of each of the power driving units 86, 89, 8C, 8F, 83 and 8M turned on or off selectively for the PWM control. As described, the control device 811 can control the rotation of the motor.

In addition, a reference number 8M indicates a power driving unit structured similarly to the foregoing power driving units 86 and operates in response to a drive output 81B for control. A reference number 8N encircled by a dashed line indicates the rotary transformer 76 shown in FIG. 7, in which a stator-side winding 8P corresponding to the stator-side winding 78 shown in FIG. 7 and a rotor-side winding 8Q corresponding to the rotor-side winding 79 shown in FIG. 7. Based on a current value 8R detected by the current detecting means which detects a current passing through the stator-side winding 8P, the control device 811 calculates a rotor current Ir for estimating thereof. A method of this calculation and operations of the rotary transformer 76 will be described with FIG. 20. A circuit 8S corresponds to the rectifying circuit 7H shown in FIG. 7, and in this circuit, the output of the rotary transformer 76 is rectified to generate a rotor current Ir passing therethrough. Reference numbers 8T, 8U, 8V, and 8W show serially connected rotor windings, which correspond to the rotor windings R1 and R1/, R2 and R2/, R3 and R3/, and R4 and R4/, respectively. The control device 811 has the configuration as described and drives not only the currents Ia, Ib, Ic, Id and Ie of the respective phases of the stator but also the rotor current Ir, thereby controlling the rotation positions, rotation speeds, torque amounts, and other necessary factors of the motor.

Figure 9:
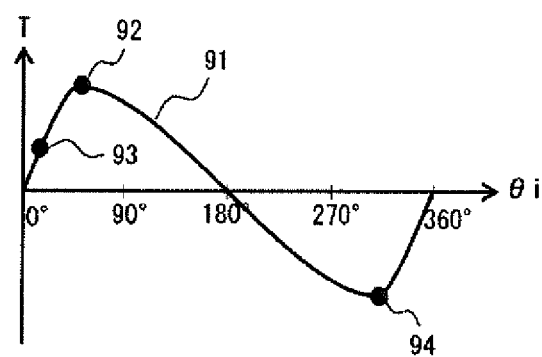
FIG. 9 is a graph exemplifying a relationship between a current phase angle θi and torque T.

FIG. 9 shows a quantitative relationship between the current phase θi and torque T of the motor shown in FIGS. 1 and 2. FIG. 9 has an abscissa axis indicating the current phase θi ranging from 0 degrees to 360 degrees and an ordinate axis indicating the torque amounts. When the motor is energized in FIG. 1 and the current phase is changed from θi=0 degrees to 360 degrees, the torque 91 changes as shown in a characteristic curve, by way of example. During a period of such changes, the current control angles for the respective phases change in accordance with the repressions (4) to (8), with fixedly maintaining the rotor rotation angle at θr=0 degrees. For example, at an operating point defined by the current phase θi=0 degrees, the motor of FIG. 1 is energized, so that magnetomotive forces resulting from the stator currents and the rotor curates are cancelled out with each other, thus generating no field magnetic fluxes. Hence, the torque T is zero. An operating point at the current phase θi=36 degrees, the field current component increases, so that the field magnetic fluxes increase and torque also increases, in the motor energized states shown in FIGS. 2 and 3. At an operating point 92, the field current component has been increased, but a magnetic saturation characteristic in magnetic steel sheets appears gradually. Hence, due to this saturation, an increase in the field magnetic fluxes is suppressed, and a product of the field magnetic fluxes and the torque current component becomes maximum. At an operating point defined by the current phase θi=180 degrees, the field magnetic fluxes become maximum, but this point also provide zero to the torque current component, i.e., T=0. An operating point 94 provides the torque with a negative maximum value. This characteristic curve shows a point symmetry from the operating points at the current phase θi=0 and 180 degrees.

In the torque characteristic 91 shown in FIG. 9, a ratio between the rotor current Ir and the current amplitude Imax of each of the phases of the stator can be kept at the same value but their amplitudes can be changed their amplitudes. In such a case, the torque characteristic curve 91 moves up or down in FIG. 9 in similar figure curves. In contrast, when the rotor current Ir itself and the current amplitude Imax itself of each of the phases of the stator are changed solely or in combination, the torque characteristic curve changes into various figures, so that the such characteristic curves can also be usable.

Figure 10:
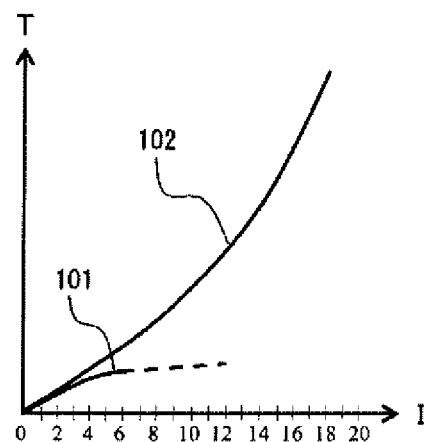
FIG. 10 is a graph exemplifying a relationship between a current I and the torque T.

FIG. 10 shows a quantitative comparison of the conventional motor and the motor according to the present invention, in respect of a relationship between the motor current I and the torque T. FIG. 10 has an abscissa axis indicating a motor current obtained by using 1 for a constant rating current, so that, for example, a number "4" in the abscissa axis shows a value four times larger than the constant rating current. In FIG. 10, the ordinate axis shows amounts of torque T.

FIG. 10 shows a characteristic 101 exemplifying a conventional interior permanent magnet synchronous motor (IPSM) or similar motors. In currently commercially available motors, the torque T linearly increases in proportion to current supplied within a range up to a torque amount of approx. three times larger than a constant rating torque, but the torque amount of the three times or more is not guaranteed. It is thus common that the torque of such conventional motors is saturated at an amount which is five times larger than a constant rating torque. In general, in a large current region, magnetic members such as magnetic steel sheets will saturate magnetically so that operating points of permanent magnets will change, resulting in that the power factor decreases and copper loss increases. This will reduce power efficiency of the motor.

Meanwhile, in the motor according to the present invention, both the rotor current Ir and the current amplitude Imax of each phase of the stator are changed. And a maximum torque point, such as the operating point 92 in FIG. 9, is obtained to have a relationship between the motor current I and the torque T as shown by the torque characteristic 102 in FIG. 10. In a region where the motor current is smaller, the obtained characteristic is not so much different from that of the conventional motors, rather being disadvantageous in some degree due to needing supply of the rotor current. In contrast, in a region which needs current amounts larger than five times of the constant rating, large values of the torque can be generated in FIG. 10. In addition to this, the torque in such larger current range can increase at a rate of a 1.3-th power or more, thereby being able to produce torque amounts larger than that obtained by a linear increase.

One of the reasons the motor according to the present invention can output larger amounts of torque is, as explained, the stator currents and the rotor currents are opposed to each other via the airgap and the positive and negative currents enable the magnetomotive forces to be cancelled out with each other, thus not causing magnetomotive forces around the currents. In other words, the field current components generate field magnetic fluxes, and the torque current components generate torque but do not generate the armature reaction. Hence, there is no effect on the field magnetic fluxes from the torque current components.

Generally, the following formula is well known which describes a generated force F:

$$F = B \cdot I \cdot L \quad (11),$$

wherein B denotes a magnetic flux density, I denotes a current value, and L denotes a length of wire along which magnetic fluxes act. Torque T is a product of the force F and a radius. In the conventional motors, there will occur an armature reaction, which makes it difficult to maintain field magnetic fluxes at a contact amount due to changes in distribution of the magnetic flux density B in the larger-current range. Moreover, the torque constant decreases, leading to a concern about a saturation in the torque or other various issues. Accordingly, the formula (11) presents an issue that the magnetic flux density B will change in a larger current range and a larger torque range. In addition, using an actual motor model is not sufficient to analyze or search for electromagnetic actions exerted on a motor portion generating the power. Incidentally, even if a motor is configured such that the magnetic flux density B is proportional to the current I, the force F is generated in accord with the formula (11) and torque according to the square of the current I is generated, as long as the density B is not magnetically saturated.

Hence, based on the following formula derived from Maxwell stress formula, a torque generating mechanism of the motor according to the present invention will now be described with referenced to FIG. 11. The formula (12) represents a force in the circumferential direction, which acts in the airgap of the motor.

$$FEN = (BR \times BEN) / \mu \quad (12),$$

wherein FEN denotes a force exerted in the circumferential direction, BR denotes a magnetic flux component along the radial direction in the airgap, BEN denotes a magnetic flux component along the circumferential direction in the airgap, and μ denotes a permeability in vacuum. There is no factor of the motor current in the formula (12), so that this formula means that the force can be expressed as a result of the electromagnetic actions. Hence, using this formula, it can be considered that the circumferential force FEN is generated by the kinds of state or distribution of the magnetic fluxes. It will be easier to consider both magnetic fluxes which contribute to gendering the circumferential force FEN and magnetic fluxes which do not contribute so much to generating the circumferential force FEN.

Figure 11:
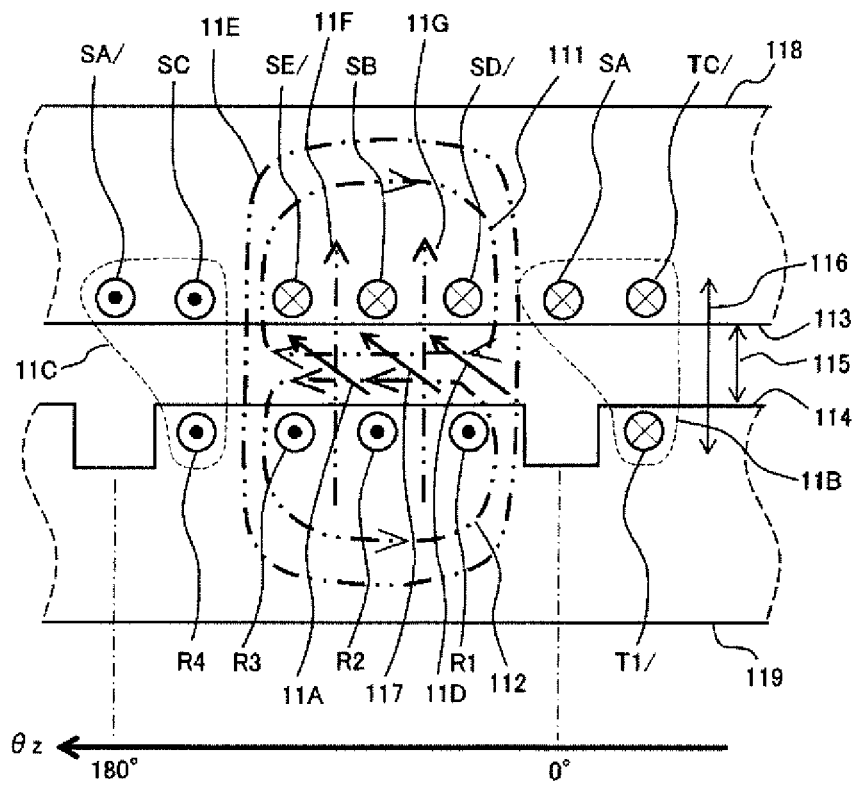
FIG. 11 is a partially enlarged illustration explaining operations of a motor according to the present invention.

FIG. 11 is an enlarged view of only a central part between the motor angles θz=−36 degrees and θz=180 degrees shown in FIG. 3. In FIG. 11, the same components are given the same reference numbers used in FIG. 3. FIG. 11 is a linearly developed view, in which the upper part shows the stator and lower part shows the rotor in the drawing. A reference number 113 shows an airgap surface of the stator, a reference number 114 shows an airgap surface of the rotor, and an airgap 115 is provided between both surfaces 113 and 114. The outside of wave-shaped dashed lines 118 in the stator and the outside of wave-shaped dashed lines 119 are omitted from being drawn. Further, the airgap 115 is exaggerated for the sake of easier explanation. The slot shapes shown in FIG. 2 are also omitted.

With reference to FIGS. 1 to 3, the example has been described such that there are no sharp changes in the waveforms of the stator currents of the individual phases during the rotations of the rotor. Practically, it has been assumed that the stator currents are driven by trapezoidal waveforms of currents as shown in FIG. 6. In contrast, in FIG. 11, driving using rectangular-wave currents will be explained, because motor rotation focuses on a lower-speed rotation range which needs larger currents and torque output. As will be explained, the rectangular-wave drive is advantageous in reducing motor loss and producing an inverter with a more compact size. In the motor shown in FIG. 11, the force FEN based on the formula (12) can be explained simply. In FIG. 2, when the rectangular-wave currents allows a positive current Ir to pass from the front to the rear in the drawing, as indicated by a mark of a circle combined with an x-symbol, whilst, when the rectangular-wave currents allows a negative current −Ir to pass from the rear to the front, as indicated by a mark of a circle combined with a dot. The state of FIG. 2 shows the current phase θi=36 degrees and the rotor rotation position θr=0 degrees. Since FIG. 3 is an enlarged view of FIG. 2, FIG. 11 is also an enlarged view of a part of FIG. 3, the positive current Ir is supplied to the windings TC/, SA, SD/, SB, and SE/ of FIG. 11. Similarly, the negative current −Ir is supplied to the windings R1, R2, R3, and R4. In addition, the positive current Ir is supplied to the winding T1/, while the negative current −Ir is supplied to the windings SC and SA/.

Figure 25:
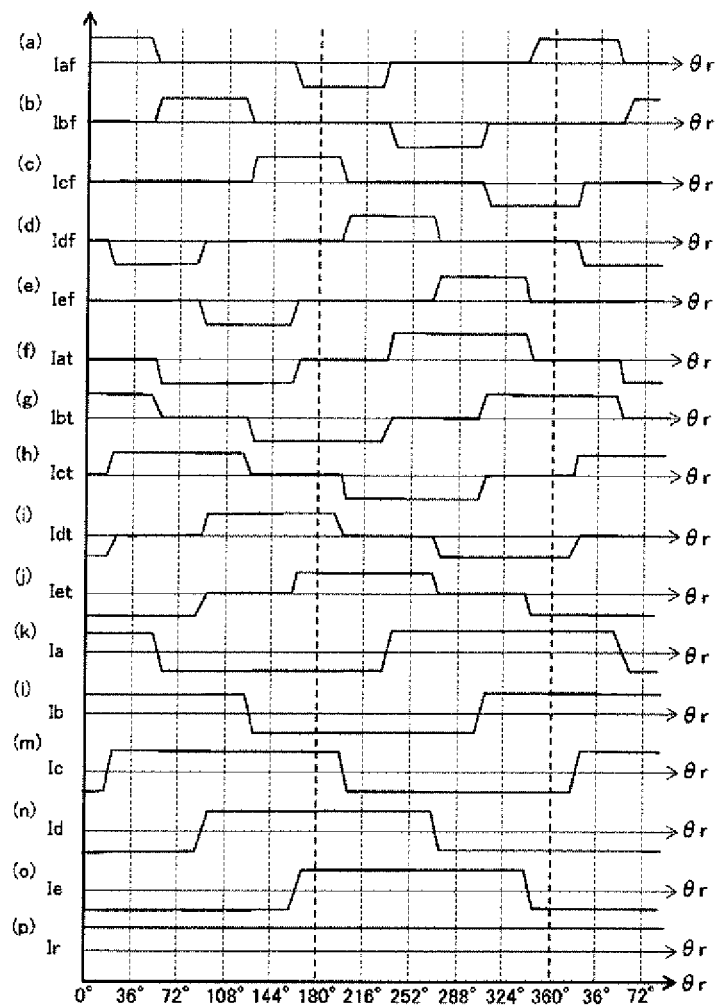
FIG. 25 is a graph exemplifying how to drive a motor using trapezoidal currents.

An example of the rectangular-waveform currents applied in FIG. 11 is shown in FIG. 25. The current phase θi is 36 degrees, the rotor rotation positions θr are assigned to the abscissa axis, and currents are assigned to the ordinate axis. A chart (a) of FIG. 25 shows an A-phase field current component Iaf, a chart (f) thereof shows an A-phase torque current component Iat, a chart (k) thereof shows an A-phase current Ia=(Iaf+Iat). The same is true of B-, C-, D- and E-phases. A chart (p) of FIG. 25 shows a rotor current Ir. The respective phase current waveforms can be adjusted depending on motor characteristics, including reducing torque ripples, for improved performance of the motor. In a high-speed rotation range, the waveform can be changed approximately to smoother rise and fall waveforms, or smoother sinusoidal waveforms.

In the foregoing energized state of the motor shown in FIG. 11, both of a current 3×Ir passing through the windings TC/, T1/ and SA, shown by a broken line 11B, and a current −3×Ir passing through the windings SC, R4 and SA/, shown by a broken line 11C, generate radial magnetic flux components 11F and 11G, shown by two-dot chain lines, in regions among the currents. The magnetic flux components 11F and 11G passing through the N-pole of the rotor 119 pass through the back yoke of the stator 118, pass through either an S-pole of the rotor located between a motor angle θz=−180 degrees to 0 degrees or an S-pole of the rotor located between a motor angle θz=180 degrees to 360 degrees, and pass through the back yoke of the rotor 119, whereby the circulation is completed.

The positive current Ir passing through the stator winding SD/ and the negative current −Ir passing through the rotor winding R1 are close to each other. For this reason, a total magnetomotive force from these two windings are cancelled out, thus being 0. Hence, from Ampere's law, the magnetomotive force of the two windings does not affect the surrounding. Similarly, the same theory can be applied to the mutually opposed windings SB and R2, and SE/ and R3, whereby a magnetomotive force from these paired windings to the surrounding is zero. The six currents are located such that the mutually opposed currents via the airgap offset their magnetomotive forces, so that there is caused no magnetomotive force outside the six currents (windings), thus causing no armature reaction.

More practically, a circuital integration value of a magnetic field strength H vector along a path 11E indicated by a two-dot chain line becomes zero according to Ampere's law, because a sum of currents passes through an inside of the path 11E. Hence, magnetic fluxes generated along the path 11E become zero. However, within an inside encircled by the path 11E, magnetomotive forces are partially generated. For example, there is a path 111 indicated by a two-dot chain line. A circuital integration value of a magnetic field strength H vector along the path 111 becomes a sum "3×Ir" of currents passing through the stator windings SD/, SB and SE/ located within the path 111, according to Ampere's law. Further, a circuital integration value of a magnetic field strength H vector along the path 112 becomes a sum "−3×Ir" of currents passing through the stator windings R1, R2 and R3 located within the path 111, according to Ampere's law. Since the rectangular-wave current drive is for non-linear drive, it is effective if an algorithm is employed with which current excess and deficiency caused due to the rotor rotation is compensated by all the currents of the motor.

The magnetic fluxes 111 and 112 produce circumferential magnetic flux components MFG in both the airgap 115 and its surrounding. Radial magnetic flux components 11F and 11G in both the airgap 115 and its surrounding and the circumferential magnetic flux components MFG are combined with each other, and the combined magnetic fluxes 117, 11A and 11D can be depicted as shown in FIG. 11. To avoid the drawing from being complicated, the combined magnetic fluxes are depicted only in the airgap 115. A magnetic flux density of such combined magnetic fluxes is divided into a radial magnetic flux density component and a circumferential magnetic flux density component, and these components are applied to the formula (12), so that a circumferential force exerted in the stator and the rotor can be calculated. Moreover, by multiplying the calculated value by the radius of the rotor, an amount of torque can be calculated.

Because the airgap length between the stator core inner surface and the rotor core outer surface can be made smaller at an extent of approx. 0.5 mm, it is possible that the stator windings and the rotor windings of the motor according to the invention are arranged to be closer to each other as much as possible in the configuration of FIG. 11, resulting in a gap between both windings of the stator and rotor coming closer to the airgap length. Accordingly, even when the radial magnetic flux density in the airgap 115 becomes larger, such as densities larger than 2 tesla, a sectional area in the circumferential direction in the airgap and its near surrounding is still small, so that amounts of magnetic fluxes in the circumferential direction are relatively smaller.

On the other hand, in a portion of the stator, which is on the opposite side to the stator, the radial length of the back yoke is tens of times larger, compared with the airgap length of 0.5 mm. As a result, the circumferential magnetic flux density component of the magnetic flux 111 in the back yoke is smaller, so that magnetic resistance at this portion is also lower. As to the rotor magnetic flux 112, a portion of the stator, which is on the opposite side of the airgap, the circumferential magnetic flux density component of the magnetic flux 112 is also smaller, thereby providing a lower magnetic resistance to this magnetic flux 112, due to that fact that the back yoke of the rotor is wider. These magnetic fluxes 111 and 112 thus do not affect so much the radial magnetic flux components 11F and 11G in the back yoke members in terms of the magnetic flux densities.

In this way, the motor according to the present invention has an advantage that both the currents passing through the stator windings SD/, SB and SE/ and the currents passing through the rotor windings R1, R2 and R3 confine the circumferential magnetic flux component MFG in the thin airgap and its near surrounding. As stated, as to the magnetic fluxes 111 and 112, the back-yoke members have smaller magnetic resistance values, thereby being less consuming of the magnetomotive force. As a result, the foregoing six currents can raise, up to a higher level, a magnetic flux density component BEN of the circumferential magnetic flux component MFG in the airgap.

Passing of the radial magnetic flux components 11F and 11G through the airgap 115 is relatively easier to the fluxes even when the circumferential magnetic flux density component of the airgap is very large, because the distance of the airgap is smaller, such as 0.5 mm.

In the combined magnetic fluxes 117, 11A and 11D, a mutually attracting force is exerted between the stator and the rotor, a circumferential force is generated according to the formula (12). Meanwhile a sum calculated between the currents through the stator windings SD/, SB and SE/ and the currents through the rotor windings R1, R2 and R3 is zero. Hence, magnetomotive forces generated by such currents are cancel each other out, thus being less in influencing the radial magnetic flux components 11F and 11G in a macroscopic view. Namely, theoretically, the currents of such windings will not cause an armature reaction to the surroundings.

Supplying larger amounts of currents to the stator windings TC/, SA, SC and SA/ and the rotor windings T1/ and R4 makes it possible that, without being affected by the armature reaction caused due to the other currents, the radial magnetic flux components 11F and 11G, i.e, field magnetic flux components, can be raised. That is, the radial magnetic flux density BR according to the formula (12) can be raised. Because of being less influence of the armature reaction, the field magnetic flux component can be generated relatively easily by adopting, for example, permanent magnets which can be arranged in the rotor, rotor- and stator-arranged field windings dedicated to the field magnetic flux, or other means.

In this way, it is possible to raise both the radial magnetic flux density component BR and the circumferential magnetic density component BEN which are expressed by the formula (12). As a result, as shown in FIG. 10, torque in a larger current range can be made larger than a value proportional to the current. Practically, the density of magnetic fluxes such as combined magnetic fluxes 117, 11A and 11D can be raised to 2 tesla or more. A curve showing a torque increase in a larger current range of the torque characteristic shown in FIG. 10 is obtained as a product of both magnetic flux densities BR and BEN, from a simplified view of model.

Hence, theoretically, supplying larger amounts of current makes it possible to obtain a characteristic curve based on a square of current.

Figure 13:
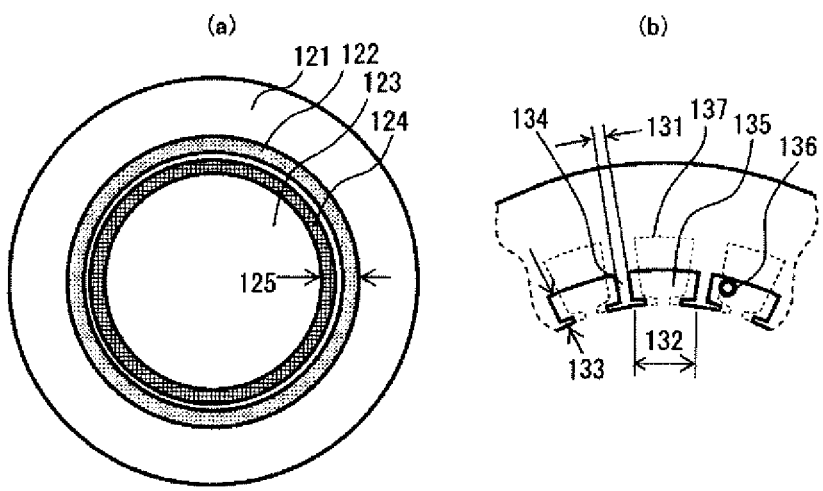
FIG. 13 is a lateral sectional view exemplifying a motor provided with a stator and a rotor both of whose teeth are reduced in size.

Although the magnetic flux densities, such as densities of combined magnetic fluxes 117, 11A and 11D are raised, it is still desirable to secure smaller amounts of circumferential magnetic fluxes in areas closer to the airgap. For such a purpose, it is required that the stator currents and the rotor currents come closer to each other in the radial direction. Only the width of the air gap 115 is not a solution to this issue. From this point of view, a motor which will be described with parts (a) and (b) of FIG. 13 is more advantageous in that the radial length between the stator windings and the rotor windings can be set smaller.

Furthermore, when obtaining a larger amount of torque by supplying larger amounts of currents, a magnetic flux density of the winding portion become larger, thus causing eddy-current loss caused in the conductor wires, thus causing a drawback in a high rotation speed range. To cope with this issue, using a large number of parallel windings, each of which is thin and insulative to another, is effective. An imbalance of currents through the parallel windings is effectively overcome employing twisted wires or displacement to current imbalance among the winding positions.

As described, the motor according to the present invention can provide characteristics showing a higher torque density and a higher output density. In an area close to the airgap in FIG. 11, the circumferential magnetic flux density component BEN of the circumferential magnetic flux component MFG can produce locally a higher magnetic flux density, such as 4 or 6 tesla, which is over 2 tesla corresponding to a saturated magnetic flux density of normal magnetic steel sheets, by supply of larger torque current components. As shown by the formula (12), the value of a magnetic flux density in portions close to the airgap in FIG. 11 is closely concerned with generation of the torque. Other portions such as back yoke portions do not contribute to generating the torque (less than 2 tesla), which is rather favorable to a motor design. For example, according to the present invention, a motor can be produced whose torque generating portion generates a substantially 6 tesla of magnetic fluxes, by using a magnetic material whose saturated magnetic flux density is 2 tesla.

In the portions close to the airgap, there is no theoretical limitation to the value of a magnetic flux density of the radial magnetic flux components 11F and 11G which are parts of the field magnetic flux components. When using a magnetic material exhibiting a saturated magnetic flux density of 2 tesla, the field excitation current components can be made very larger, so that the magnetic flux density of 2 or more tesla can be generated. At operating points at 2 or more tesla, the specific permeability comes closer to 1, but there are no limitations to the configuration and theory. As expressed by the formula (12), the torque is proportional to the radial magnetic flux density component BR at the portions close to the airgap, which means that this component BR is an important factor in generating the torque.

The circumferential force according to the formula (12), which is derived from Maxwell stress formula, is expressed as a magnetic flux density at an operating point. Accordingly, this kind of formula manner is able to express a force generated in a higher magnetic flux density range of a magnetic member used by a motor. In other words, such a higher magnetic flux density range is a range in which the specific permeability comes close to 1, or a range higher than a magnetic saturation upper limit. Moreover, as explained with FIG. 11, the motor according to the present invention provides advantages of reducing bias in the field magnetic fluxes due to the armature reaction as well as realizing higher torque by raising the magnetic flux density in the airgap more than a saturated magnetic flux density and weakening the field during a higher rotation range by arbitrary controlling the radial magnetic flux density component. It is considered that FIG. 11 shows an electromagnetic basic configuration which can generate a larger amount of force.

Incidentally, in FIG. 11, a rotor N-pole and its neighborhood regions has been shown in a range of motor angles θz from 0 to 180 degrees. In contrast, when a range of motor angles θz from 180 to 360 degrees are desired about a rotor S-pole and its neighborhood regions, the directions of currents and magnetic fluxes should be shown oppositely to those shown in FIG. 11. Even in such an oppositely changed case, the directions and amounts of the force and torque are the same direction as those shown in FIG. 11.

A first exemplary embodiment will now be described with FIG. 12, which shows a motor configuration provided by adding rotor field windings RWF to the motor configuration shown in FIG. 2. These rotor field windings are composed of field windings 126 and 127. A field current Ifrr is supplied to the field winding 126 such that the current Ifrr passes from the front to the rear in the drawing and the current Ifrr is supplied to the field winding 127 such that the current passes from the rear to the front in the drawing. As explained with FIG. 2, the field current component Jr is supplied to both the stator windings SA and the rotor winding R1/, while the field current component −Jr is supplied to both the stator winding SA/ and the rotor winding R1. All the field current components passing through these six windings generate field magnetic fluxes 128, 129 and 12A shown by two-dot chain lines.

Figure 12:
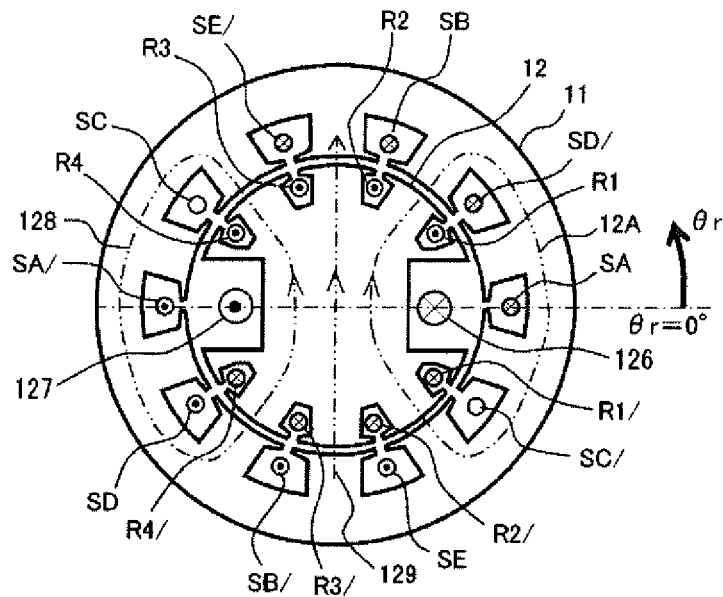
FIG. 12 is a lateral sectional view exemplifying a motor provided with a field winging.

The field windings 126 and 127 shown in FIG. 12 act to generate field magnetic fluxes, and have a clear meaning in that respect. However, when it is desired that such field windings generate field magnetic fluxes in a lower rotation range in which a larger amount of torque is outputted, the field windings are obliged to be larger in their sizes. Hence, a space occupied by the field windings also becomes larger. In contrast, in a case where the field is weakened in a higher rotation range, it is required to decease the field current Ifrr. This means that the winding space for the field windings RWF cannot be used effectively in outputting larger amounts of power. In particular, when designing a practical motor configured as a multiple-pole motor having eight poles or thereabouts, there is a confliction between a space for the field windings 126 and 127 and a space for the other rotor windings in the rotor.

Figure 29:
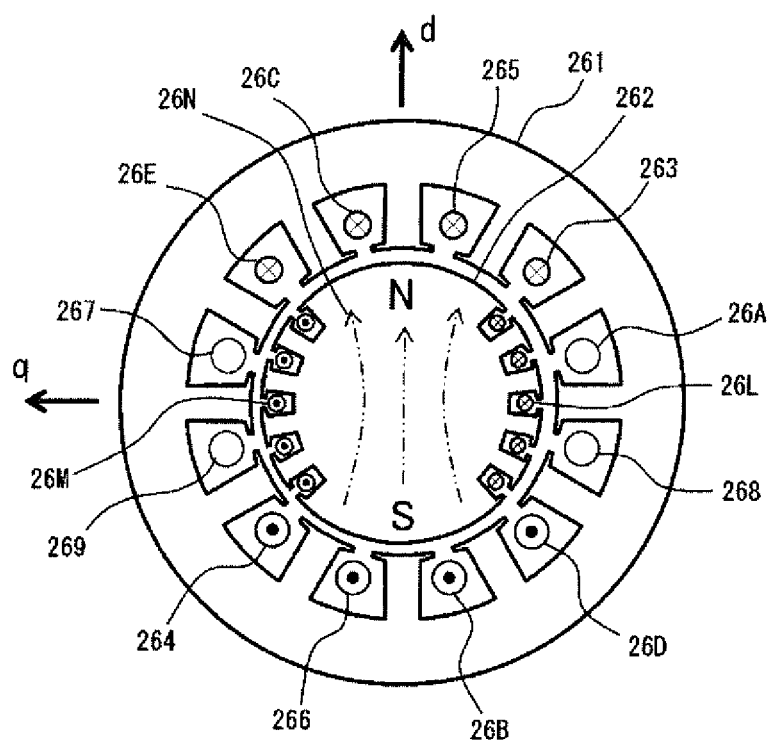
FIG. 29 is a sectional view of another conventional induction motor.

In that regard, from a viewpoint of an overall motor design, it is favorable that the field windings 126 and 127 have a diameter which can carry a current capacity which corresponds to ½ or less of a field current necessary for enabling the motor to output torque of a continuous rating. When the field excitation is insufficient in generating larger amounts of torque, an insufficient field excitation current component can be produced by controlling the current phase θi between the stator's respective windings and the rotor's windings R1, R1/, R2, R2/, R3, R3/, R4 and R4/. In this case, in cases where the stator-side torque current components and the rotor-side torque current components are mutually balanced, the forgoing field excitation current component can be supplied to either the stator side or the rotor side, thus providing the same effect in either case. In addition, when weakening the field in a higher rotation speed range, such field windings with the reduced current-carrying capacity can still be effective for the field excitation A field winding 26M wound in a cylindrical rotor shown in FIG. 29 can be added to the motor configuration shown in FIG. 2, in which, however, the rotor shape is required to be modified in conformity with the field winding 26M. This field winding 26M has functions, operations and effects which are substantially the same as those of the field windings 126 and 127 shown in FIG. 12. In the circumferential direction, the field winding 26M is arranged at a position of which electrical phase difference is 90 degrees in relation to the rotor windings R1, R1/, R2, R2/, R3, R3/, R4 and R4/.

There is also an issue about how supply the field current Ifrr to the field windings 126 and 127 from a control device and a stator side. When the drive device is configured as shown in FIG. 8, circuits and devices which are similar to the power dive unit 8M, the rotary transformer 8N, the rectifying circuit 8S, the current detection circuit, and others can be added to control and supply the field current Ifrr. However, in this case, there are left issues about complication, larger-size, and raised production cost of the motor. Other methods of supplying the field current Ifrr will be described later.

In a case where the field windings 126 and 127 shown in FIG. 12 are supplied with the field current Ifrr, assume that a motor torque command is sharply reduced from a large value. In such a case, the motor should sharply reduce the torque from a large value to a low value, so that some sorts of countermeasures are required. To reduce the torque, it is required to reduce field magnetic fluxes or reduce torque current components. However, in a case where both the field current Ifrr and the rotor current Ir are circulated via a diode, that is, a fly wheel state, it is difficult to sharply reduce both currents.

As a countermeasure for this difficulty, control can be performed such that the current phase θi between the stator currents and the rotor currents is set to be negative and a negative field excitation current component is generated to cancel out a magnetomotive force cause by the field current Ifrr. As a result, the field magnetic fluxes are reduced sharply so that the motor torque can also be reduced sharply, even when both the field current Ifrr and the rotor current Ir are supplied. However, if the field current Ifrr is a large amount in response to a motor torque command requesting a large amount of torque, there may occur a case where the negative field excitation current component cannot cancel out a magnetomotive force caused by the field current Ifrr. With consideration of such cases, it is favorable that the field windings 126 and 127 have a capacity of generating a maximum magnetomotive force which is approximately half of a maximum magnetomotive force generated by the motor field or less than the ½ force.

An alternative countermeasure is applied to use of both a brush and slip ring in order to supply the field current Ifrr. In this configuration, the field current Ifrr can be sharply reduced by control. Still, another technically possible countermeasure is to arrange a circuit to control the field current Ifrr in the rotor side, in which the circuit is configured to convert the current to electric energy such that the field current Ifrr is reduced sharply. Incidentally, when the stator currents are reduced sharply for purpose of a sharp reduction in the torque, the field magnetic fluxes are increased due to the field current Ifrr and the rotor current Ir, which may cause further drawbacks, such as excessively higher voltage occurring in a higher rotation speed range. Additionally, the field winding 26M shown in FIG. 29 may suffer from a drawback similar to the forgoing one.

An example of the motor according to the present invention, but different in the structure from that of FIG. 1, will now be described with reference to parts (a) and (b) of FIG. 13.

This exemplifies a motor which can output a large amount of torque responsively to supply of a large amount of current. When paying attention to the amplitude of the radial magnetic flux components 11F and 11G in FIG. 11, a magnetic resistance is relatively small in a case where a magnetic flux density at the rotor teeth and the stator teeth is less than 2 tesla. However, when the radial magnetic flux components 11F and 11G become larger, the magnetic fluxes are forced to pass through the magnetically saturated teeth and slot portions. In FIG. 11, the width of the airgap 115 can be smaller at 0.5 mm or thereabouts, but a radial length 116 ranging from the radially inner position of the rotor windings to the radially outer position of the stator windings is, as can be understood from the slot shapes in FIG. 1, for example 50 mm, which is 100 times larger than the 0.5 mm width of the airgap, though being just an example. In FIG. 11, the airgap 115 is drawn in an exaggerated manner about its size. Moreover, the radial magnetic flux component 22 has another difficulty such that magnetic resistance against the radial magnetic flux component becomes sharply larger when its average magnetic flux density exceeds an average magnetic flux density which can be defined as approximately half of 2 tesla, although the magnetic resistance is kept smaller in a range in which the average magnetic flux density is below the average magnetic flux density. In this case, it is assumed that the steel sheets normally used by the conventional motors have a saturated magnetic flux density of 2 tesla.

The part (a) of FIG. 13 shows a lateral section of a core-less motor from which stator tooth and rotor tooth are removed. This motor, shown in the part (a) of FIG. 13, can be provided by modifying the motor shown in FIG. 1 and other drawings. A reference number 121 shows the back yoke of a stator, a reference number 122 shows stator windings, a reference number 123 shows the back yoke of a rotor, and a reference number 124 shows rotor windings. The stator windings are composed of multiple-phase windings each of which is a round wire or a rectangular wire. Each wire is folded and formed and fixed using a high heat-resistant resin materials or other materials. A reference number 125 indicates a radial length covering the windings of both stator and rotor. In a simple comparison, this radial length 125 can be shortened to ½ or thereabouts of a radial length 116 of the windings in FIG. 11, as the windings can be arranged in the motor teeth in FIG. 1 and other drawings. Naturally, in designing the motor shown in the part (b) of FIG. 13, the radial length 125 can be shortened more. Hence, when setting a larger radial average magnetic flux density at 1 or more tesla, for example, 2 tesla, a load to magnetically excite the radial field in the motor of the part (a) of FIG. 13 can be reduced, contrary to a simple estimation. In addition, when making the radial average magnetic flux density larger, larger torque and larger output can be provided even if the currents to the stator windings 122 and the rotor windings 124 are reduced. As described, the core-less structure motor shown in the part (a) of FIG. 13 can be energized by larger amounts of current to output larger torque, in addition to realizing a compact structure, weight saving, lesser vibration, lesser noise, and other features. However, a relatively smaller current is used to obtain lower torque output, the load to magnetically excite the field is relatively increased, so that the motor efficiency is lowered.

A part (b) of FIG. 13 shows a motor provided with an intermediate structure between the motor shown in FIG. 1 and the motor shown in the part (a) of FIG. 13. A partial structure of a stator shown in FIG. 13 is made by modifying the motor of FIG. 1 into a four-pole structure and modifying a stator shape of FIG. 16. A slot shape 137, shown by a broken line, corresponds to the slot shape of FIG. 15. A reference number 134 shows a stator tooth and a reference number 135 shows a slot. Circumferential outsides of wave-formed broken lines are omitted from being drawn. A reference number 131 indicates a width of each tooth 134 of the stator, a reference number 132 indicates a circumferential width of each slot 135 at a radially inward position of the stator. Conventionally it is normal that the tooth width 131 and the slot width 132 are almost equal to each other, but in this modification, the tooth width 131 is reduced greatly. In this way, by making the tooth width 131 smaller, each slot 135 is able to have an increased sectional area, whereby a radial length 133 of each slot can be shortened. From an electromagnetic viewpoint, this motor can resemble the motor shown the part (a) of FIG. 3 in the slots and winding structures.

As a result, when the tooth width 131 becomes smaller, the stator teeth 134 can serve as aligning the stator windings and firmly fixing the stator windings. For the rotor, it is important to secure a sufficient strength for holding the windings against a centrifugal force exerted during the rotor rotation. Closing the slot opening will strengthen such holding structures. In this way, by making the tooth width 131 smaller in the motor according to the present invention, the windings can be manufactured more easily and the fixing strength to the weddings can be raised, when being compared with the motor shown in the part (a) of FIG. 13.

Furthermore, depending on applications, it is needed that larger torque is outputted under supply of large current and, at the same time, higher efficiency is obtained in a lower torque range. In such a case, by securing the tooth width 131 at the minimum required in the lower torque range, not only the radial average magnetic flux density can be raised in such lower torque range but also the larger torque is outputted, thereby being balanced between both requirements. Producing larger torque under supply of larger current will raise a motor current density, so that the copper loss of the windings become larger. Hence, active cooling of the motor is required. A reference number 136 indicates, by way of example, a cooling pipe, which is installed in the slot, closely to the back yoke, or on a part of the tooth 134. Such cooling pipes can be fixed with the tooth 134. Depending on applications, this stator and rotor can be combined with, with modifications if needed, the configuration shown in FIG. 1 and the parts (a) and (b) of FIG. 13, or other structures. Particularly, when larger current is required to energize the windings or when faster rotation is required, securing a high cooling performance should be secured by various types of cooling means.

A high-speed rotation performed by weakening the field in a controlled manner and constant output control will now be described. As described with FIGS. 1 to 4, the field magnetic fluxes can be controlled. In view of a qualitative aspect, currents other than the field current components can be supplied such that magnetomotive forces caused by the stator-side currents and those caused by the rotor-side currents cancel each other out, thereby preventing the armature reaction from occurring or reducing the degree of the armature reaction. In such prevented or reduced armature-reaction state, the field current components can be increased or decreased, so that the field can be strengthened or weakened in a controlled manner.

Figure 27:
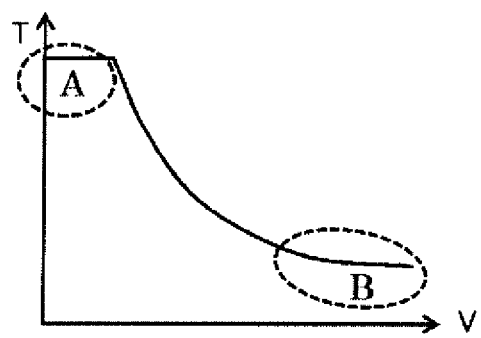
FIG. 27 is a graph showing a torque characteristic required by motors as main machines mounted in electric vehicles or in other applications.
Figure 28:
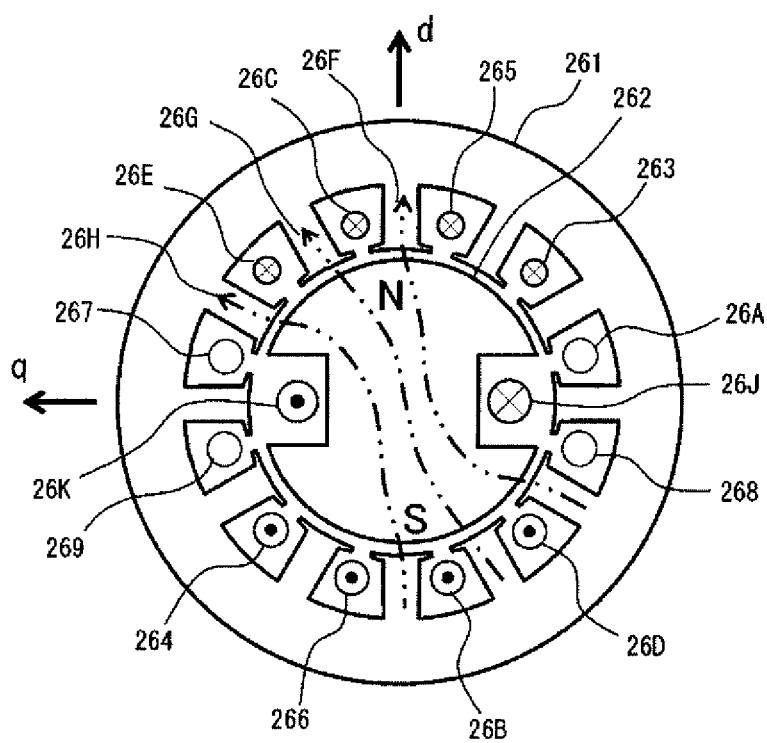
FIG. 28 is a sectional view of a conventional induction motor.

An operating point, belonging to a region A in the characteristic of the speed V and the torque V shown in FIG. 27, provides a maximum of the field current components and a maximum of the torque current components in FIG. 2 or other figures. For instance, such an operating point correspond to the operating point 92 in the qualitative characteristic between the current phase θi and torque T in FIG. 9. Meanwhile, at an operating point belonging to a region B in FIG. 27, the field current components are weakened, for example, in the case of FIG. 2, so that the torque current components are larger. This opening point can be indicated, for instance, as an operating point 93 in the current phase θi and torque T in FIG. 9. When the field magnetic fluxes are small, the motor has a smaller induced voltage constant, whereby the motor can be driven at a high rotation speed. The field weekend control is performed to keep the motor voltage at a constant value from the base rotation speed to a high rotation speed of the motor, in parallel with maintaining the torque current components. Hence, this parallel control allows a product of the motor voltage and the motor current to be constant, thus achieving, namely, constant output control.

Figure 14:
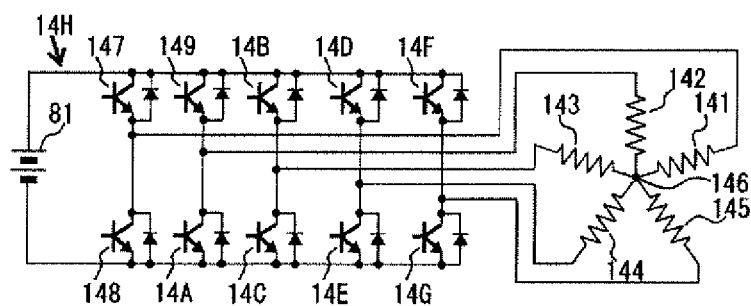
FIG. 14 is a circuit diagram exemplifying a motor and a control apparatus therefor according to the present invention, in which a star connection is employed.

FIG. 14 exemplifies a driving circuit in which the motor windings are star-connected with each other, instead of the connection form of FIG. 8. Via transistors 147 and 148, an A-phase current Ia is supplied to a A-phase winding 141; via transistors 149 and 14A, a B-phase current Ib is supplied to a B-phase winding 142; via transistors 14B and 14C, a C-phase current Ic is supplied to a C-phase winding 143; via transistors 14D and 14E, a D-phase current Id is supplied to a D-phase winding 144; and via transistors 14F and 14G, an E-phase current Ie is supplied to an E-phase winding 145. This star-connection needs a limitation to the currents supplied to the respective phases, which is defined as the following formula.

$$Ia+Ib+Ic+Id+Ie=0 \tag{13}$$

In the driving circuit of FIG. 8, the phase currents are driven independently of each other by the four transistors, thus allowing arbitrary phase-by-phase independent control. In contrast, although there is a limitation from the formula (13), the star-connected driving circuit in FIG. 14 can reduce the number of transistors from 20 in FIG. 8 to 10, thereby simplifying the structure of the driving circuit. Inversely, the configuration of FIG. 8 has no current limitation such as formula (13), thus providing a higher degree of current control. Incidentally, for the same motor output, a distribution of the volgages and currents of the windings is changed between the motors in FIGS. 8 and 14. For the same motor output, a product of a current capacity of each transistor and the number of transistors has no large difference between the inverters shown in FIGS. 8 and 14. The motor according to the present invention can be driven using either of the inverters.

Figure 15:
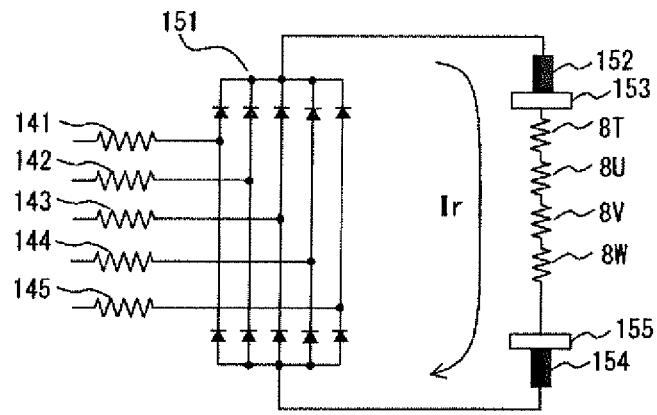
FIG. 15 is a circuit diagram exemplifying a configuration for supplying currents to the rotor by using a brush and a slip ring.

Referring now to FIG. 15, a fourth exemplary embodiment will be described. The method related to the fourth exemplary embodiment is a method of supplying the rotor current Ir and is different from the method related to the third exemplary embodiment that uses a rotary transformer. Phase windings 141, 142, 143, 144 and 145 shown in FIG. 15 are the same as those shown in FIG. 14, however, include a diode bridge 151 which is inserted at the position corresponding to the neutral point 146 to rectify the phase currents. Numeral 152 indicates a brush mounted to the stator, and numeral 153 indicates a slip ring mounted to the rotor. Similarly, numeral 154 indicates a brush and numeral 155 indicates a slip ring. Windings 8T, 8U, 8V and 8 W respectively correspond to the rotor windings R1/ and R1, R2/ and R2, R3/ and R3, and R4/ and R4. The stator current that has been rectified by the diode bridge 151 is supplied to the rotor using the two brushes 152 and 154, and the slip rings 153 and 155, and then supplied as rotor current Ir. The brushes and the slip rings are mounted in place of the rotary transformer 76 and the rectifying circuit 7H of FIG. 7.

In the case of the configuration shown in FIG. 15, the rotor current Ir can be generated from the stator current by using the diode bridge 151. Therefore, the driving circuit for the rotor current Ir shown in FIG. 8 can be simplified. Furthermore, the amplitude of the rotor current Ir can be permitted to passively match that of the stator current and thus the balance between the stator and the rotor can be reliably maintained. This configuration is simple and causes fewer errors. However, the configuration and the method shown in FIG. 15 raise issues of reliability, useful life and maintenance burden. This method is suitable for an application where the rotation speed is low and the utilization ratio is low. The rotor current Ir may be supplied by a driving circuit, e.g., the power drive unit 8M shown in FIG. 8.

Figure 26:
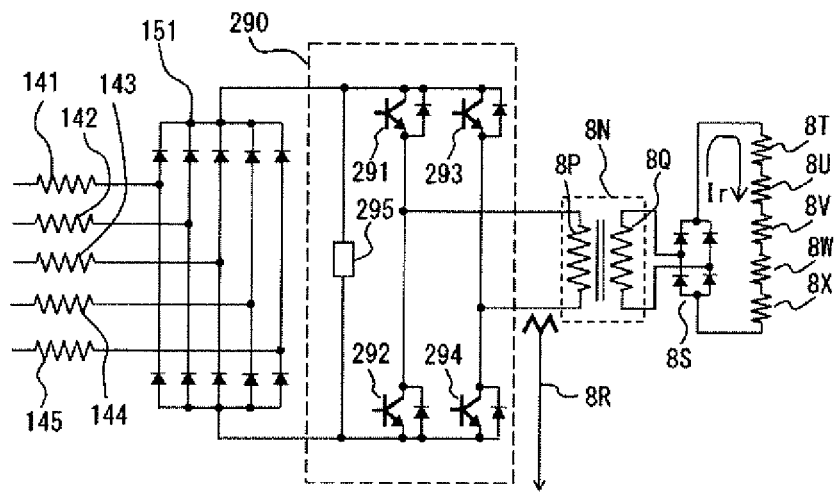
FIG. 26 is a circuit diagram showing supply of currents to the rotor by using a DC-AC converter.

Referring to FIG. 26, another method will be described. In this method, the brushes and the slip rings shown in FIG. 15 are not used. In place of the brushes and the slip rings, a DC-AC converter enclosed by the broken line 290, a rotary transformer 8N and a rectifying circuit 8S are used. As viewed in FIG. 26, on the right side of the output 8R of the current detecting means and the rotary transformer 8N, the configuration is the same as that shown in FIG. 8.

The DC-AC converter 290 includes transistors 291, 292, 293 and 294 which convert the direct current that is an output of the diode bridge 151 into alternating current, for supply to a primary winding 8P of the rotary transformer. Numeral 295 indicates a capacitor, a filter, or the like which prevents overvoltage. The rotary transformer includes a secondary winding 8Q whose output is converted to direct current by the rectifying circuit 8S, for supply as rotor current Ir to the rotor windings 8T, 8U, 8V, 8W and 8X. The functions of the configuration shown in FIG. 26 are substantially the same as those of the configuration shown in FIG. 15, and accordingly, the amplitude of the rotor current Ir can be permitted to passively match the stator current. Thus, the issues of reliability, useful life and maintenance burden of the brushes and the slip rings can be settled. However, if the stator current rapidly decreases in the configuration shown in FIG. 15 or 26, decrease of the rotor current Ir is delayed because of being circulated in the diode. Accordingly, some measures, such as control of the current phase θi, are required. It should be noted that various modes of circuits can be used as the DC-AC converter 290.

Figure 18:
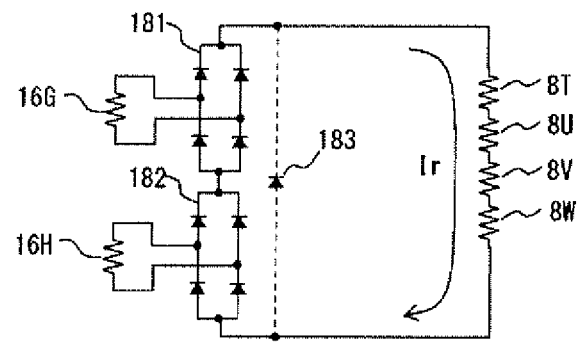
FIG. 18 is a circuit diagram showing rotor windings and rectifying circuits, in which power for the field excitation is supplied to the rotor in a contactless manner.

Moreover, as to supplying the rotor current Ir, there can be provided a configuration different from those shown in FIGS. 15 and 18. Specifically, a current passing between a DC power source 81 and an inverter in FIG. 14, that is, a part indicated by an arrow 14H, can be used as the rotor current Ir. This current shown by the arrow 14H is a DC current component to the inverter. This part is cut and connected to brushes 152 and 154 shown in FIG. 15 so that the rotor current Ir can be supplied. Alternatively, for obtaining the rotor current Ir, a DC-AC converter 290 and a rotary transformer 290 can be used.

However, in this case, since the current circulated between the inverter and the motor windings, i.e., the flywheel current, is not passed to the rotor, an error may be caused between the stator current and the rotor current. In particular, in an operating mode which is important such as in an EV, a large torque is required to be generated at low speed rotation. In this case, the error mentioned above may increase extremely and may greatly vary depending on the rotation speed, raising a serious problem. However, in the case of an operation at substantially constant rotation and torque, the problem may be settled by, e.g., controlling phase of the stator current.

Figure 16:
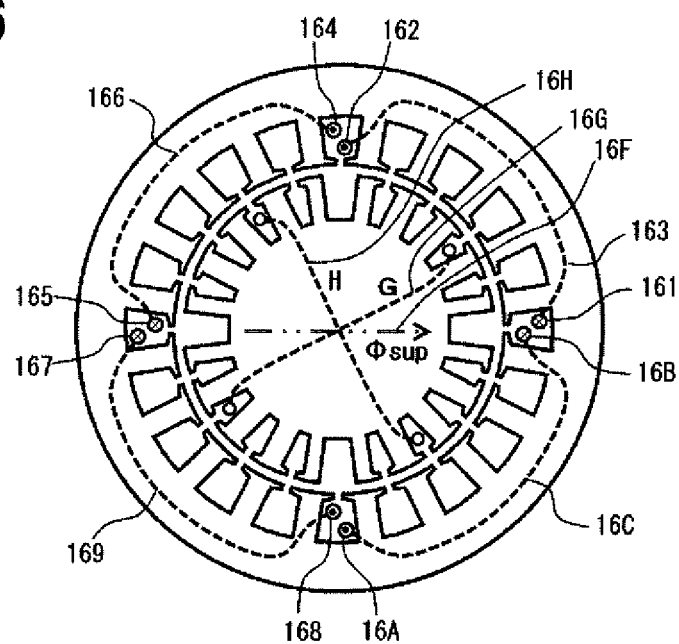
FIG. 16 is a lateral view of a motor in which power for field excitation is supplied to the rotor in a contactless manner.
Figure 17:
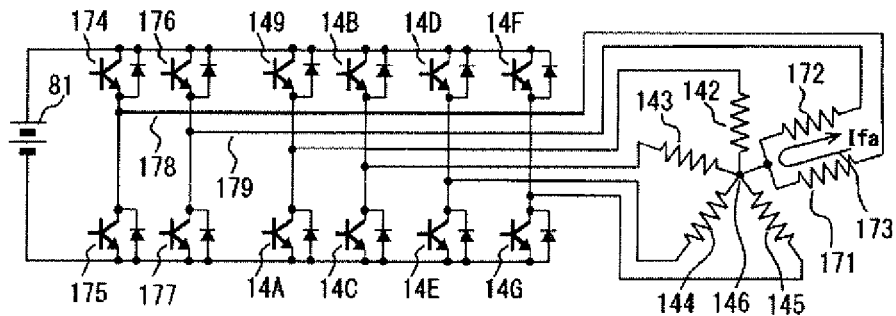
FIG. 17 is a circuit diagram showing a driver connected windings, in which the driver supplies, in a contactless configuration, power for the field excitation to the rotor.

Referring to FIGS. 16 and 17, a fifth exemplary embodiment will be described, in which the rotor current Ir is supplied based using a configuration different from the third and fourth exemplary embodiments. FIG. 16 is a cross-sectional view of a 4-pole motor based on the motor shown in FIG. 1. The stator includes 20 slots and the rotor includes 20 slots. The stator has concentrated windings which are composed of five-phase and full-pitch windings. The driving circuit for the windings is shown in FIG. 17. Compared to FIG. 14, the A-phase winding 141 is separated into an A1-phase winding 171 and an A2-phase winding 172. Current Ia1 of 178 is supplied to the A1-phase winding 171 by transistors 174 and 175. Current Ia2 of 179 is supplied to the A2-phase winding 172 by transistors 176 and 177. To supply the electrical power of the rotor, supply current Ifa, which is alternating current different from the five-phase current of the motor, is superimposed on these currents and the superimposed currents are supplied between the A1- and A2-phase windings 171 and 172. These are expressed by the following Formulas.

$$Ia1 = Ia/2 + Ifa \tag{14}$$

$$Ia2 = Ia/2 - Ifa \tag{15}$$

$$Ia = Ia1 + Ia2 \tag{16}$$

$$Ifa = (Ia1 - Ia2)/2 \tag{17}$$

The number of turns of the A1- and A2-phase windings 171 and 172 is the same as that of other phases so that the same voltage is obtained. Since the configuration other than the A1 and A2 phases is the same between FIGS. 14 and 17, description is omitted.

Referring to FIG. 16, a method of supplying electrical power, or supplying rotor current, from the stator to the rotor will be described. Since the electrical power is supplied using the A1- and A2-phase windings 171 and 172, FIG. 16 shows only the A1- and A2-phase windings 171 and 172 as stator windings. As mentioned above, this motor is a 4-pole motor based on the motor shown in FIG. 1. Accordingly, except for the A-phase winding, windings of other phases have the same configurations between FIGS. 16 and 1. The A1-phase winding 171 corresponds to windings 161, 162 and 163, and windings 164, 165 and 166 having a motor angle of θz that is in the range or 0° to 360° in electrical angle. The A1-phase winding 171 corresponds to windings 161, 162 and 163, and windings 164, 165 and 166 having a motor angle of θz that is in the range or 0° to 360° in electrical angle. The A2-phase winding 172 corresponds to windings 167, 168 and 169, and windings 16A, 16B and 16C having an electrical angle in the range or 360° to 720°. The A-phase current has directions indicated by the current symbols in FIG. 16. Considering only the supply current Ifa that is supplied after superimposition, the current symbols 167, 168, 16A and 16B of the A2-phase winding are reversely directed according to Formula (15). For the supply current Ifa, 165 and 167 cancel with each other, and 161 and 16B cancel with each other. The current supply directions of the supply current Ifa for 16B and 16A are reverse of those of the current symbols. As a result, magnetic flux $sup excited by the supply current Ifa will be 16F as indicated by the two-dot chain line. Due to the supply current Ifa which is supplied being superimposed on the A-phase current Ia, magnetic flux of 720° period is obtained as a result of excitation. The configuration and operation shown in FIG. 14 apply to B, C, D and E phases.

The rotor is wound by a power receiving G winding 16G and a power receiving H winding 16H which are perpendicular to each other for interlinkage of the magnetic flux $\phi$sup. The power receiving G winding 16G and the power receiving H winding 16H, which are each wound at a pitch of 360°, are windings having a 720° period. As shown in FIG. 18, current of the power receiving G winding 16G is inputted to a diode bridge 181 so that the AC voltage is rectified to DC. Current of the power receiving H winding 16H is inputted to a diode bridge 182 so that the AC voltage is rectified to DC. These voltages are added together and applied to rotor windings 8T, 8U, 8V, 8W and 8X which are the same as those shown in FIG. 15, so that rotor current Ir is supplied. Thus, using the A-phase winding, electrical power required for the rotor current Ir can be supplied from the stator to the rotor in a contactless manner. The relationship between the AC supply current Ifa and the DC rotor current is simple similarly to the relationship between the primary current and the secondary current of a transformer. Accordingly, the rotor current Ir can be estimated from the stator side and can be precisely controlled by feedback control. Furthermore, the five-phase current of a 360° period in terms of electrical angle has a principally non-interfering relationship with the 720°-period supply current Ifa. Therefore, these currents are unlikely to affect the functions and performance of the five-phase motor. Since the supply current corresponds to the resistance consumption of the rotor winding and has a relatively small amplitude, the load and influence, which are caused by the supply of this rotor electrical power, on the control of the stator current are comparatively small.

In FIG. 18, voltage drop of the diode bridges 181 and 182 corresponds to the voltage of four diodes. Accordingly, by adding a diode 183, voltage drop when the rotor current Ir is circulated can be reduced to ¼. The method described referring to FIG. 16 or 17 may be modified in various ways in terms of the windings, rectifier, inverter, and the like. Phases other than the A phase may be used. All the phases may be used. In an application where the motor is used at substantially constant rotation, permanent magnets may be mounted to the stator, and the power receiving G winding 16G and the power receiving H winding 16H may be used as generator windings to thereby supply the rotor current Ir. The power receiving windings of the rotor may be a single-phase or three or more-phase winding instead of the two-phase winding of G and H shown in FIG. 16. This may be applied to motors having a different number of phases other than five phases.

The following description explains a modification of the method described referring to FIGS. 16 and 17. The modified method uses a five-phase winding to supply the rotor current Ir. The stator winding has a 10-phase winding configuration in which the B, C, D and E phases each have two windings similarly to the A phase. B1- and B2-phase windings, C1- and C2-phase windings, D1- and D2-phase windings and so E1- and E2-phase windings are configured so as to have a relationship similar to the A1- and A2-phase windings. Similarly to the supply current Ifa of the A phase, these windings are configured to respectively supply currents Ifb, Ifc, Ifd and Ife therethrough and these currents are configured to serve as 720°-period currents of the motor. The relationship of phase currents Ib, Ic, Id and Ie with the respective supply currents Ifb, Ifc, Ifd and If3 is similar to the relationship expressed by Formulas (14), (15), (16) and (17).

Since the supply current Ifa described referring to FIGS. 16 and 17 has a single phase, single-phase AC current and voltage are used. However, the five-phase supply currents Ifa, Ifb, Ifc, Ifd and Ife use five-phase AD current. The five-phase supply currents generate 720°-period rotating magnetic flux $\phi$im for the rotor. The rotating flux $\phi$im has a frequency Fim which may be arbitrarily selected. The connecting method and the like shown in FIGS. 16 and 18 apply herein, in terms of the power receiving G winding 16G and the power receiving H winding 16H of the rotor, and the rectifiers 181 and 182.

The 720°-period rotating magnetic flux caused by the five-phase supply currents Ifa, Ifb, Ifc, Ifd and Ife interlinks with the power receiving G winding 16G and the power receiving H winding 16 to generate voltages Vg and Vh respectively in these windings. The voltages Vg and Vh are proportional to the product of the magnitude of the rotating magnetic flux and the difference between the frequency of the rotating magnetic flux and ½ of the electrical angular rotational frequency of the rotor rotation. As shown in FIG. 18, the voltages Vg and Vh are rectified to supply the rotor current Ir. Therefore, it is necessary to precisely control the amplitude and the frequency Fim of the five-phase supply currents according to the rotation speed of the rotor.

The supply currents will be specifically described for easy understanding. Specifically, the frequency Fim of the five-phase supply currents is determined and controlled so that the difference between the electrical angular frequency Fim of the rotating magnetic flux $\phi$im and ½ of the electrical angular rotational frequency of the rotor will have a constant value Fs. In this case, the frequency of the voltage induced in the power receiving G winding 16G and the power receiving H winding 16H may be Fs. The amplitude of the five-phase supply currents may be determined and controlled according to the amplitude of the rotor current Ir to be supplied. In this case, the power receiving G winding 16G and the power receiving H winding 16H may be regarded to be the windings of the generator that generates power according to the rotating magnetic flux. The example described herein is based on an assumption that the rotating magnetic flux $\phi$im has a 720° period that is twice the period of the motor. However, similar power supply can be realized in an application or modification where the rotating magnetic flux $\phi$im has a period that is an integer multiple of 360°.

There is another method that can be used for supplying electrical power to the rotor. In this method, pulse current, high frequency current or the like is superimposed on the current by using the power drive units 86, 89, 8C, 8F, 83 and 8J shown in FIG. 8, the magnetic flux of the current is permitted to respectively interlink with the rotor windings 8T, 8U, 8V, 8W and 8X, and the rotor current Ir is held by the diode 183 shown in FIG. 18 as flywheel current. Alternatively, power receiving windings for receiving the pulse current or the high frequency current may be provided so that the voltage of the power receiving windings can be full-wave-rectified, and the rotor current Ir may be supplied to the rotor windings 8T, 8U, 8V, 8W and 8X. Alternatively, magnetic flux components of spatial harmonics may be produced in the motor structure or in the airgap by stator current, a winding WKM may be provided to the rotor so that the spatial harmonic magnetic flux interlinks therewith, and the voltage of the winding WKM may be rectified for supply of the rotor current Ir.

A sixth exemplary embodiment will be described. The sixth exemplary embodiment relates to the method and apparatus for controlling the motor of the present disclosure, which is shown in FIGS. 1 to 5, 8, 9 and 11, Formulas (9) and (10), and the like. As a summary, the torque of the motor of the present invention can be controlled by controlling the amplitudes of the stator current and the rotor current and the relative phase difference between these amplitudes. To prevent or reduce the armature reaction, a total IWSP of the torque current components of the stator is made equal to a total IWRN of the torque current components of the rotor, i.e., control is performed as expressed by Formula (9). This method not only reduces the armature reaction, but also concentrates the circumferential magnetic flux density component BEN expressed by Formula (12) on the vicinity of the air gap. Accordingly, the force FEN expressed by Formula (12) can be increased. It should be noted that the field current component produces the magnetic flux density component BR in the radial direction.

A seventh exemplary embodiment will be described. The seventh exemplary embodiment relates to the method and apparatus for controlling the motor of the present disclosure and the stator current, which are shown in FIGS. 1 to 6, 8, 9, 11 and the like. Specifically, the current phase $\theta i$ of the stator is controlled relative to the circumferential position $\theta r$ of the rotor winding RW. By controlling the current phase $\theta i$, the ratio of the field current component and the torque current component can be arbitrarily controlled. In this case, the rotor current Ir is supplied so as to be balanced with the sum of the field current component and the torque current component. Examples of these controls have been described referring to FIGS. 1 to 6 and the like. As a matter of course, the magnitudes of the torque and the field magnetic flux can be controlled by variably controlling not only the current phase $\theta i$ but also the magnitude or amplitude of current.

If there is a difference between the field current component Ifs of the stator and the field current component Ifr of the rotor, various modifications can be made such as by treating the unbalanced field magnetic current component Ifrx of Formula (10) as another variable. This method not only reduces the armature reaction, but also concentrates the circumferential magnetic flux density component BEN expressed by Formula (12) on the vicinity of the air gap. Accordingly, the force FEN expressed by Formula (12) can be increased. Although the variable of control is differently treated between the sixth and fifth exemplary embodiments, the purpose is almost the same.

One of other characteristics of the method of controlling the current phase $\theta i$ as a parameter is that there is less current bias such as of allowing the amplitude of the stator current of a specific phase to increase more than the current values of other phases. This is because the field current component is separated from the torque current component due to the current phase $\theta i$. Thus, load is evenly imposed on the transistors of the driving inverter, thereby reducing the load of the driving inverter.

As another characteristic, good motor torque response can be obtained even when the motor torque commands rapidly decrease. Specifically, in the case of the embodiment shown in FIG. 8, AC voltage that is the output of the rotary transformer 8N is rectified by the diode rectifying circuit 8S, so that the rotor current Ir is supplied to the windings 8T, 8U, 8V, and 8W of the rotor. In this configuration, the attempt of rapidly decreasing the rotor current Ir may cause the rotor current Ir to circulate between the rotor winding and the diode rectifying circuit 8S. Therefore, it is difficult to rapidly decrease current. In this regard, the method using control of the current phase $\theta i$ can rapidly reduce the value of the field magnetic flux component by changing the value of the current phase $\theta i$ to a small value even when the rotor current Ir moderately decreases. Therefore, torque can be rapidly reduced. When driving EV, rapidly decreasing a large torque output is a required important performance for safety. It should be noted that simply rapidly decreasing the stator current for rapid decrease of the torque may allow increase of the field magnetic flux due to the rotor current. This may raise a new issue of overvoltage at high speed rotation.

The description referring to FIGS. 1 to 5 has been provided by way of an example in which the same rotor current is supplied using five-phase stator current by connecting the windings of the slots in series. Stator current waveform has also been described by way of an example of the current having a rectangular waveform or the current having substantially a trapezoidal waveform. However, the stator current may have a sinusoidal waveform or may have various waveforms between rectangle and sine. The driving circuit 86 or the like of FIG. 8 can control the waveform of the current as desired.

In particular, at high speed rotation when the stator current has a waveform approximate to a rectangle, there may be an instance that the current rapidly changes, and therefore current control may be difficult. Accordingly, as the rotation speed becomes higher, it is more effective to control the waveform of each phase current of the stator so as to be approximate to sinusoidal waveform. Control satisfying Formula (9) can achieve an effect of reducing armature reaction.

As the waveform of each phase current of the stator is approximated to a sinusoidal waveform, the control apparently exhibits similarities to the sinusoidal waveform control for the interior permanent magnet motors based on conventional art. However, the motor of the present invention is different from the motors of the conventional art in that the rotor current is present, or part of the rotor current serves as a field current component. Furthermore, unbalanced control is available between the stator current and the rotor current. However, it should be noted that the components that do not cancel the magnetomotive force of each other's current may affect the magnitude and distribution of the field magnetic flux.

One of the aims of the motor of the present invention is to reduce loss of motor efficiency in the region of high current at low speed rotation or large torque output, or to reduce current capacity of the inverter. This leads to cost and size reduction. When sinusoidal waveform and rectangular waveform are compared to each other from this point of view, AC voltage and AC current having a sinusoidal waveform and an amplitude of 1V and 1 A will have an output of 0.5 W. In the case of AC voltage and AC current having a rectangular waveform and an amplitude of 1V and 1 A, the output will be 1 W. When comparison is made using inverters of the same voltage and current, the rectangular waveform motor will have an output that is twice the output of the other. Accordingly, the rectangular waveform inverter can reduce the size of the inverter to ½. Loss herein is taken to be 0. Considering the loss of motor winding, copper loss corresponds to the product of the square of current and the winding resistance. Thus, when the output is the same, copper loss can be reduced to ½ in the rectangular waveform motor. Accordingly, the rectangular waveform motor can reduce its size.

The size and the inverter capacity of the main engine motor of an electric vehicle depend on the performance under conditions of high current at low speed rotation or large torque output. Low speed rotation enables motor control with a voltage waveform or current waveform approximate to rectangle, which is advantageous from the perspective of size and cost reduction. On the other hand, operation at high speed rotation or operation with a load of middle or small torque causes no large disadvantage if the waveform is approximated to a sinusoidal waveform from a rectangular waveform. Thus, from the perspective of reducing loss due to low torque ripple, low noise or harmonic component, it may often be preferable to approximate the waveform to a sinusoidal waveform. Waveforms may be suitably used.

Rotor current has been described by way of an example in which the windings of the slots are connected in series and the same current is supplied to the individual slots. However, the number of turns may not necessarily be the same between the slots. For example, in a modification, distribution of the numbers of turns around the slots in the circumferential direction may be made suitable for a sinusoidal waveform. Alternatively, various types of rotor windings or various types of rotor currents may be used, although the motor structure may become complicated.

Next, an example according to an eight exemplary embodiment shown in FIG. 19 will be described. As shown in FIG. 1, FIG. 2, and the like, the motor of the present invention is configured such that the torque current component IWSP of the stator and the torque current component IWRN of the rotor are carried in an opposing manner, via the airgap portion. One of the opposing currents is a positive current and the other is a negative current. A relationship shown in formula (1), formula (9), and the like is established. In addition, magnetomotive forces that are applied to the periphery by the opposing positive current and negative current are cancelled, and the armature reaction hardly occurs in the periphery thereof.

In this state, because the effect of the torque current component is not received, field magnetic flux can be generated with relative ease by various methods. The various methods include a field current component ISFAD that is carried to the stator, a field current component IRFAD that is carried to the rotor, a permanent magnet that is arranged in the rotor, and the like. The field magnetic flux can be generated through combined use of these methods and the above-described method for controlling the current phase. Here, generated force and torque can be expressed by formula (11), formula (12), and the like. As one formula, it can be considered that force works in a certain direction by the field magnetic flux $\phi x$ and the above-described IWSP, and force works in the opposite direction by the field magnetic flux $\phi x$ and the above-described IWRN. As a result, it can be considered that force is relatively generated between the stator and the rotor through the field magnetic flux $\phi x$.

Figure 19:
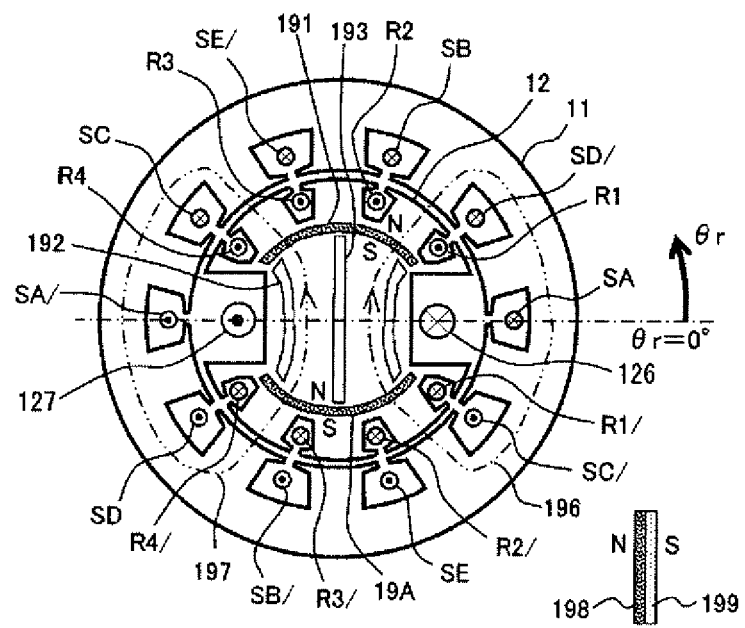
FIG. 19 is a lateral sectional view exemplifying the configuration of a motor according to the present invention.

For example, regarding the field current component ISFAD of the stator, a current component Iu that is carried to the winding SA in FIG. 19 from the front of the drawing paper to the back side and returned from the winding SA/ can be added or a current component Iv that is carried from the front side of the drawing paper of the winding SC/ to the back side and returned from the winding SC can be added, and the field magnetic fluxes such as those shown by 196 and 197 can be generated by Iu, Iv, and the like.

For example, regarding the field current component IRFAD of the rotor, windings 194 and 195 in FIG. 19 can be added. A current Ix that is carried to the winding 194 from the front side of the drawing paper to the back side and returned from the back side to the front side by the winding 195 can be carried, and the field magnetic fluxes such as those shown by 196 and 197 can be generated. Here, in cases in which the magnitude of the field magnetic flux is to be controlled independently from the rotor current Ir, the windings 194 and 195 that are separate from the windings R1/ and R5 are required to be arranged and the necessary field current Ix is required to be carried. Here, the windings 194 and 195 may be distributed among a plurality of slots. In addition, the windings 194 and 195 may be provided in slots that differ from those of the windings R1/ and R5. Furthermore, modifications such as currents being superimposed are also possible.

When the rotor current Ir is carried to the rotor winding and driving is performed, the direction of the field magnetic flux within the rotor is a substantially fixed direction. Therefore, the field magnetic flux can also be generated by permanent magnets such 191 and 19A being arranged in the rotor. When the field magnetic flux is required to be increased or decreased, the above-described field current component ISFAD, the above-described field current component IRFAD, or the method for controlling the current phase $\theta i$ can also be used in combination.

Four quadrant drive that includes regeneration and reverse-direction rotation that generates negative torque, and the like requires change in the direction of the field magnetic flux, the direction of the current, and the like. In the motor shown in FIG. 2 and the like, the negative torque can be generated by the current phase $\theta i$ being changed from a positive value to a negative value, and the direction of the field magnetic flux being reversed. However, in the case in which the permanent magnets 191 and 19A are provided in the motor in FIG. 19, to generate the negative torque, there is a method for magnetizing the permanent magnets in opposite directions in which field excitation in directions opposite to the polarity directions of the permanent magnets is performed. Alternatively, the rotor current is set to zero and the energization direction of the stator current is reversed. Alternatively, the energization directions of both the rotor current and the stator current are reversed. In this manner, the configuration becomes slightly more complex than that of the motor in FIG. 2 and the like.

In addition, in a state in which the permanent magnets 191 and 19A are not provided, spaces referred to as slits or flux barriers such as those shown by 192 and 193, non-magnetic bodies, or the like can be added. The quantity thereof can be increased or decreased. In addition, permanent magnets may be arranged inside the flux barriers 192 and 193, or the like. In particular, a space portion or a non-magnetic body 199 can be arranged such as to be in close contact in the polarity directions of the N and S poles of the permanent magnet 198. As a result, the amount of magnetic flux that is generated by the permanent magnet can be reduced. However, the strength of a large magnetic field can be exerted against magnetomotive force that is applied from outside. A characteristic of resilience against magnetomotive-force disturbance can be achieved. The configuration thereby is effective. In addition, both the permanent magnets 191 and 19A, and the flux barriers 192 and 193, and the like may be added.

In particular, the radial-direction magnetic flux component 22 can be generated by the permanent magnets 191 and 19A as a result of the permanent magnets 191 and 19A being permanent magnets that can be magnetized, demagnetized, or made to have magnetic characteristics of an arbitrary strength. Current load of field excitation can be reduced.

Variations in the magnetic characteristics of the permanent magnets 191 and 19A can be achieved by magnetization and demagnetization through use of the stator current of each phase, the rotor current, and the like. In addition, combined use of the permanent magnets and the field current component, and the like is also, of course, possible.

The armature reaction does not occur in the motor of the present invention. Therefore, leeway regarding demagnetization of the permanent magnet and the like can be significantly reduced. In addition, the motor can be configured through use of a small amount of the permanent magnets, such as by magnet thickness being reduced. The burden of cost can be reduced. In addition, the strength of the permanent magnet can be more easily varied. Even should demagnetization inadvertently occur, magnetization can be performed.

In cases in which a large torque is generated in the motor shown in FIG. 1 to FIG. 5 and the like, even should the permanent magnets 191 and 19A and the flux barriers 192 and 193 shown in FIG. 19, and the like be added, the effects thereof are limited. However, in cases in which a relatively small torque is generated in the motor shown in FIG. 1 to FIG. 5, resistance loss from the rotor current Ir and resistance loss of the field current component become a burden. A problem arises in that motor efficiency decreases. Therefore, in a relatively small torque region, efficiency can be increased in the motor shown in FIG. 19, in a manner similar to the conventional permanent magnet motor, by the rotor current Ir and the field current component being reduced through use of the permanent magnets 191 and 19A, the flux barriers 192 and 193, and the like. In addition, in a large torque region, operations shown in FIG. 1 to FIG. 5 and the like are performed. In an intermediate torque region, optimization of the operations can be performed. In this manner, characteristics that combine the characteristics of the motor shown in FIG. 1 to FIG. 5 and the like and the characteristics of the conventional permanent magnet motor can be achieved. Here, FIG. 19 shows a model with two poles to describe the principles. However, when the number of poles is increased to about eight poles, modification to a more practical shape can be performed. For example, the permanent magnet can have a flat plate-like shape.

In addition, FIG. 19 shows an example in which the rotor is substantially circular in shape. However, the outer circumference of the rotor may have an uneven shape. In addition, although functions and performance are limited as a result of a simple configuration being used, various modifications are possible. For example, in a multipolar configuration of eight poles or more, a single rotor winding may be provided per pole. The configuration may be such that only a single turn of a slightly thick copper wire is arranged in the slots of the rotor. Simplification in terms of the way that the windings are mounted can be achieved. In this case, because the rotor current increases, a turn ratio of the rotary transformer 76 is required to be increased. In addition, the stator structure can be a simple concentrated-winding configuration.

Figure 20:
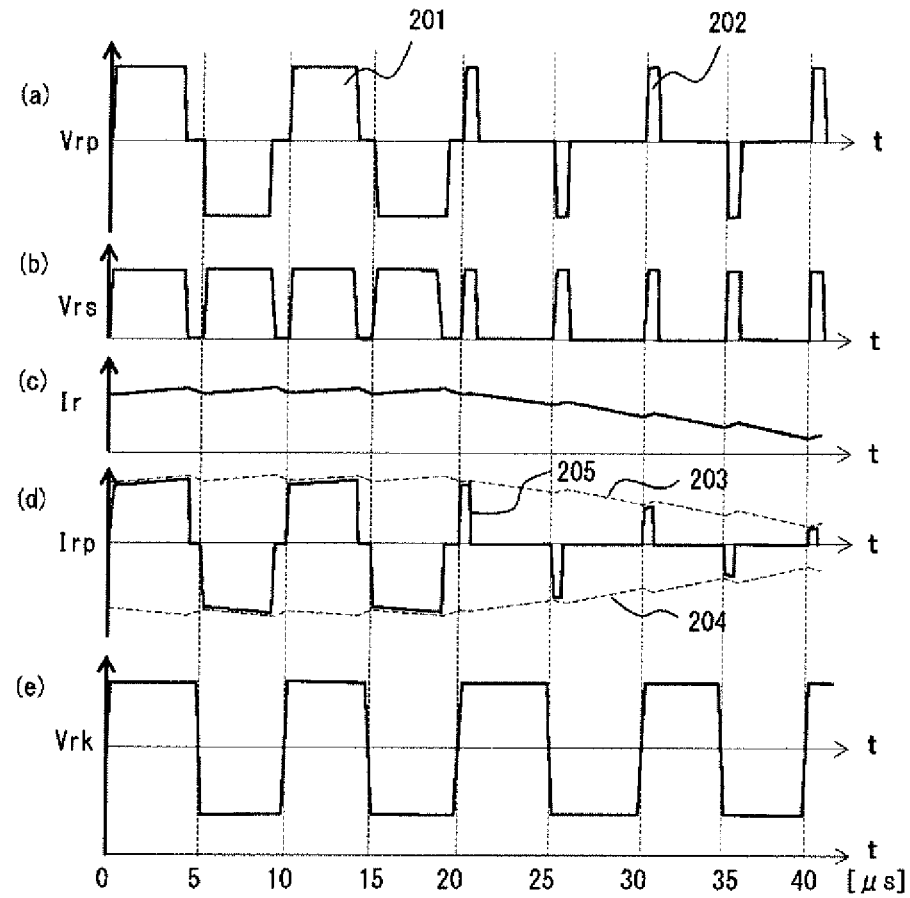
FIG. 20 is a timing chart explaining how to estimate and measure rotor currents using a rotary transformer.

Next, the relationship among the input voltage Vrp, the input current Irp, and the rotor current Ir of the rotary transformer 76 shown in FIG. 7 and the rotary transformer 8N shown in FIG. 8, and a method for detecting the rotor current Ir will be described. FIG. 20 is a time chart of the voltages and currents in the periphery of the rotary transformer. A horizontal axis indicates time. In this example, the rotary transformer is driven at 100 kHz. A single cycle thereof is 10 psec. In FIG. 20, a part (a) is an example of the input voltage Vrp of the rotary transformer 8N in FIG. 8. A portion indicated by 201 is an average voltage of which the pulse width is wide and relatively large. A portion indicated by 202 is an average voltage of which the pulse width is narrow and relatively small. A part (b) in FIG. 20 is a direct-current voltage Vrs that is a rectified output of the rotary transformer. The waveform of the direct-current voltage Vrs the rectified waveform of the input voltage Vrp. A part (c) in FIG. 20 is an example of the rotor current Ir. The rotor winding has a large inductance Lr and a small winding resistance. Therefore, the rotor current Ir is a current value that is a first-order lag of the applied voltage. A part (d) in FIG. 20 is an example of the waveform of the input current Irp of the rotary transformer 8N. A broken line 203 is the waveform of the rotor current Ir. A broken line 204 is a negative value of 203.

Attention should be given to a proportional relationship being established between the rotor current Ir and the input current Irp of the rotary transformer 8N while the input voltage Vrp is on and a large positive or negative voltage is outputted, and the rotor current Ir being measurable. The input current Irp of the rotary transformer 8N can be measured by the current detection value 8R in FIG. 8. That is, when a current value Itv that is supplied to the rotary transformer 8N is measured at a timing at which a large voltage is supplied to the rotary transformer 8N, the obtained value is a value that is proportional to the rotor current Ir. The value of the rotor current Ir can be measured. In the motor of the present invention, the rotor current Ir is required to be measured. The configuration is effective in that supplying of the rotor current Ir and detection of the rotor current Ir can be performed in the rotary transformer. Here, while the input voltage Vrp is off and substantially 0 volts, the rotor current Ir is circulated by the rectification circuit 8S in FIG. 8 and is in a flywheel state. Calculation can be performed as an electric circuit of the rotary transformer 8N, the rectification circuit 8S, inductance Lr, and winding resistance Rr. In addition, (e) in FIG. 20 is a voltage waveform when a maximum voltage is supplied in the rotary transformer.

Figure 21:
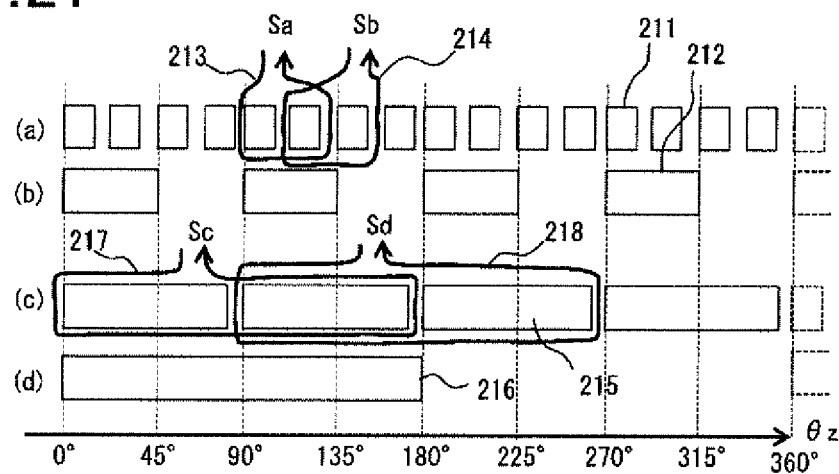
FIG. 21 is an illustration explaining how to measure rotational positions of the rotor using the rotary transformer.

Next, a ninth exemplary embodiment will be described with reference to FIG. 7, FIG. 21, and FIG. 22. In the technology, a rotation position detection apparatus for the rotor is provided in a portion of the rotary transformer 76 in FIG. 7, taking advantage of the rotary transformer 76 being excited at a high frequency. FIG. 21 is a diagram in which a horizontal axis is a motor angle θz, and each section of the rotation position detection apparatus is horizontally exploded such that the circumferential-direction shape that faces the airgap between the stator and the rotor in a linear state. (a) in FIG. 21 is 7E in FIG. 7 and is a position sensor unit on the stator side. In this example, rectangular protruding portions 211 are arrayed in the circumferential direction at an interval of 22.5° electrical angle. (b) in FIG. 21 is 7F in FIGS. 7 and 212 therein is a sensor magnetic pole that is arranged on the rotor side. A section through which magnetic flux passes and a section through which magnetic flux does not pass are formed by the protrusions and recesses thereof, for detection of the rotor position. The rotor rotation position θr in FIG. 21 is 0°. In this example, the sensor magnetic pole 212 is a protruding portion with a width of 45° electrical angle and a circumferential-direction pitch of 9°. A recessing portion is formed over the remaining 45°. The protruding portion 211 and the sensor magnetic pole 212 oppose each other with the airgap therebetween. Meanwhile, an A-phase detection winding 213 that has a pitch of 45° electrical angle is wound around the protruding portion 211, and the output thereof is Sa. A similar B-phase detection winding 214 is arranged such as to have a phase difference of 22.5° with the A phase detection winding 213 in the circumferential direction. The pitch of the B-phase detection winding 214 is 45° and the output thereof is Sb.

When the rotor rotation position θr of the sensor magnetic pole 212 in FIG. 21 is 0°, the voltage generated in Sa is maximum when θr=0° and minimum when θr=45°. The maximum and minimum voltages are repeated at a 90° interval. The voltage generated in Sb differs from that of Sa in terms of the circumferential-direction position by 22.5°. Therefore, the voltage is maximum when θr=22.5° and minimum when θr=67.5°. The maximum and minimum voltages are repeated at a 90° interval. In addition, the signals of Sa and Sb use a portion of the magnetic flux of the rotary transformer 76. Therefore, as shown in the example of the voltage waveform thereof in (a) in FIG. 20, for example, when the frequency is 100 kHz, the pulse width of an alternating-current voltage of the pulse width varies from 0 to 5 μsec, based on the magnitude of the supplied power.

To obtain rotor rotation position information from Sa and Sb, Sa and Sb are each subjected to full-wave rectification. Direct-current signals Sax and Sbx are generated from the alternating-current signals. Next, Sax and Sbx are normalized so as to be unaffected by the supply voltage of the rotary transformer. The voltage that is the rectified supply voltage of the rotary transformer is Vrs in (b) in FIG. 20. Therefore, a filtering process is performed on this voltage and an average value Vrsa is generated. As a result of Sax and Sbx being divided by Vrsa, position signals Pa and Pb of two phases shown in FIG. 22 are generated.

$$Pa = Sax/Vrsa \quad (18)$$

$$Pb = Sbx/Vrsa \quad (19)$$

In addition, it is known that, when sine waves that differ in phase by 90° electrical angle are each squared and then added, a square of the amplitude value of the sine wave is obtained and the value is a constant value. Regarding the method for normalization, the normalized signals of Pa and Pb can also be obtained by an amplitude value CXV being determined by Sax and Sbx, and CXV being substituted for Vrsa in formulae (18) and (19). In addition, the two normalization methods, described above, may be combined. Furthermore, a technology for performing, by two sine-wave signals, interpolation calculation of a position within a sine wave period from two-phase sine-wave signals that mutually differ in phase by 90° is well known as a mainstream position detection technology used in resolvers for position detection, optical encoders, magnetic encoders, and the like. The position signals Pa and Pb in FIG. 22 are triangular-wave signals with a period of 90° electrical angle of the rotor. The position signals Pa and Pb have a phase difference of 22.5°. Through interpolation calculated by a similar method, a rotor rotation position signal having a period of 90° electrical angle of the rotor can be generated. Here, a description of the above-described technology for performing interpolation calculation of a position from two-phase sine-wave signals is omitted. In addition, the shape of the sensor magnetic pole 212 may be changed from a rectangular shape to a rounded shape. The triangular-wave signal may be changed to be closer to a sine-wave signal.

To control each phase current and phase voltage of the motor, absolute position information for the 360° electrical angle period of the rotor is required. The periods of (a) and (b) in FIG. 21 may be 360° electrical angle. However, to improve the position detection accuracy regarding the rotor, a multiple-layer position detection method involving two layers, three layers, or the like can be used. 215 of (c) in FIG. 21 is a position sensor unit on the stator side and has a width of 90° 216 of (d) is a sensor magnetic pole that is arranged on the rotor side and has a width of 180°. The position sensor unit 215 and the sensor magnetic pole 216 configure a rotation position detection apparatus of a 360° electrical angle period. A winding 217 is a C-phase detection winding and has a pitch of 180°. The output thereof is Sc. A winding 218 is a D-phase detection winding and has a pitch of 180°. The winding 218 is arranged to have a phase difference of 90° with the C-phase detection winding 217 in the circumferential direction. The output thereof is Sd. Here, the configurations of (c) and (d) in FIG. 21 are not shown in FIG. 7 and can be added in a manner similar to the configurations of the position sensor unit 7E and the sensor magnetic pole 7F.

Figure 22:
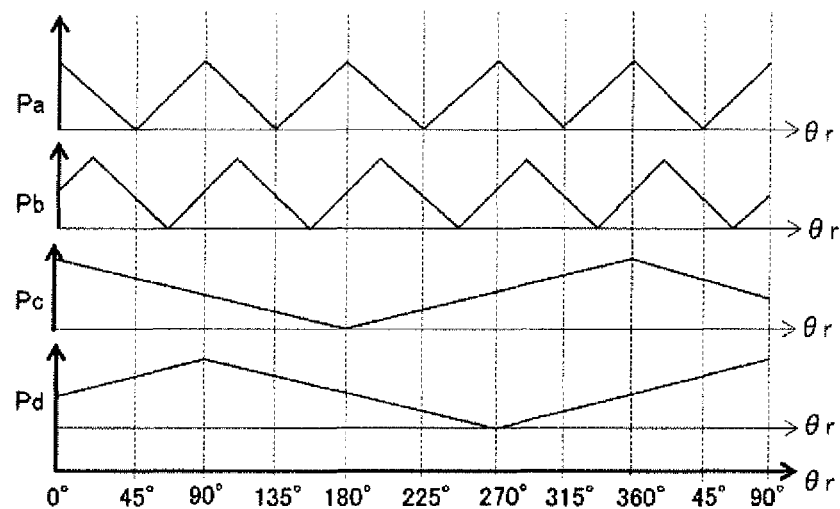
FIG. 22 is a characteristic showing measurement of rotational positions of the rotor using a part of the rotary transformer.

Pc and Pd in FIG. 22 can be generated from the signals Sc and Sc by a method which is similar to the signal processing of Sa and Sb. in a manner similar to that of Sa and Sb. Rotor position detection of 360° electrical angle can be performed. In addition, through combination with a rotor position signal of a 90° period that is generated from Pa and Pb, a highly accurate rotor position detection of 360° electrical angle can be performed. In this manner, a fine/rough multiple-level position detection can be performed. In addition, precise position detection by (a) and (b) in FIG. 21 can become difficult because processing time becomes shorter in position detection at high-speed rotation. At high-speed rotation, control can be performed mainly using the rough information of the position detecting unit in (c) and (d) in FIG. 21.

Here, the configurations shown in FIG. 7. FIG. 21, and FIG. 22 can be modified, combined, and the like in various ways. For example, the windings 213, 214, 217, and 218 are shown to have a single-turn configuration. However, in practical use, the number of turns is required to be optimized. As a result of the windings also being wound around other position sensor units of the same phase and connected in series, position detection accuracy can be improved. A signal that has resilience against disturbances such as eccentricity in the rotor can be generated. In addition, determination of an absolute position at 360° mechanical angle may also be actualized by a means for detecting a specific position of the motor angle θz and incremental position detection in (a) and (b) in FIG. 21. Here, the motor of the present invention and the control apparatus thereof can, of course, be configured through use of an entirely different position detection apparatus, sensor-less position detection, or the like.

Next, a tenth exemplary embodiment will be described with reference to FIG. 23. Various control circuits are provided in the rotor. The method enables control of each current of the rotor as required. In the example in FIG. 23, the same rotary transformer 8N as that in FIG. 8 is used as the power supply means of the rotor. The voltage of the rotary transformer 8N is the voltage shown in (e) in FIG. 20. The rotary transformer 8N can function as a high-frequency alternating-current voltage source. The rotary transformer 8N can supply electric power from the stator side to the rotor side, perform rectification and obtain a direct-current voltage, and can be used for various types of control on the rotor side. In addition, in the configuration in FIG. 23, the rotary transformer 8N can also perform power regeneration from the rotor side to the stator side.

A reference number 23Q indicates a transmission/reception circuit on the stator side. The stator-side transmission/reception circuit 23Q outputs transmission signals, such as a command regarding the rotor current Ir and a command regarding the field current. The stator-side transmission/reception circuit 23Q also receives rotor information from the rotor side. 23 R is a communication means for communication by radio waves, communication by light, communication by high-frequency current components passing through the rotary transformer 8N, or the like. 23G is a transmission/reception circuit on the rotor side. The rotor-side transmission/reception circuit 23G receives the transmission signal from the stator-side transmission/reception circuit 23Q and outputs the transmission signal to a rotor-side control circuit 23H. The rotor-side transmission/reception circuit 23G also transmits rotor-side information from the rotor-side control circuit 23H to the stator-side transmission/reception circuit 23Q.

Figure 23:
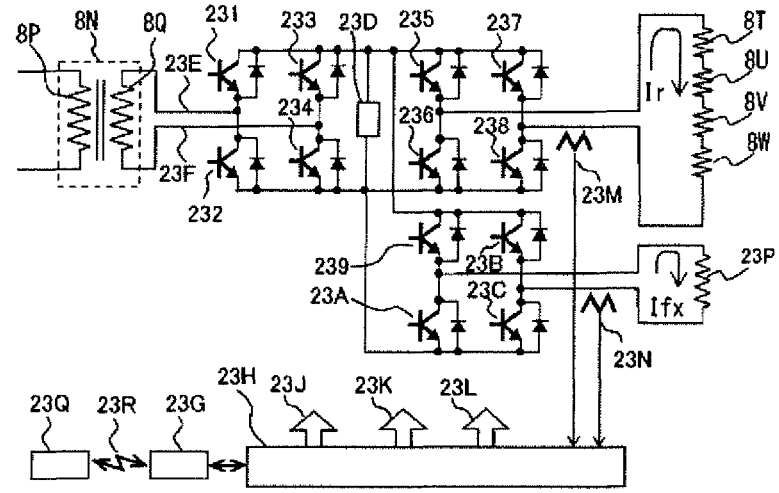
FIG. 23 is a circuit diagram exemplifying a power circuit and a current control circuit which are arranged in the rotor for various types of current control.

When the rotor current Ir is carried to the windings 8T, 8U, 8V, 8W, and 8X in FIG. 23, the alternating-current voltages of 23E and 23F that are supplied from the rotary transformer 8N are rectified by the diodes that are connected in parallel to transistors 231, 232, 233, and 234. The direct-current voltage is stabilized by a capacitor 23D or the like. Then, the rotor current Ir is carried by transistors 235 and 238. At this time, when power regeneration from the rotor side to the stator side is not performed, the transistors 231, 232, 233, and 234 are not required. In addition, when a current is supplied to each winding load but the current is in only one direction, the transistors 236 and 237 are not required.

For example, the rotor-side control circuit 23H detects a current value 23M of the rotor current Ir and compares the current value 23M with a command value of the rotor current Ir. The rotor-side control circuit 23H then outputs a control signal 23K for the transistors 231, 232, 233, and 234, and controls the rotor current Ir. In this manner, alternating-current power can be supplied to the input winding 8P of the rotary transformer 8N from the stator side. The command value of the rotor current Ir can be transmitted to the rotor side by the communication means 23R. The rotor current Ir can be autonomously controlled on the rotor side.

When a current Ifx is carried to a field winding 23P, a control signal 23L for transistors 239, 23A, 23B, and 23C is outputted based on a command value of the current Ifx that is transmitted by the communication means 23R and a value of a current value 23N of the current Ifx. The current Ifx is thereby controlled.

In addition, control of other currents of the rotor can be added in a similar manner as required. As a result of the configuration in FIG. 23, many types of currents can be controlled on the rotor side. Therefore, the functions and performance of the motor can be improved. For example, the current of the rotor can have multiple phases and be controlled. A winding that magnetically excites the field can be added on the rotor side, the field excitation can be performed.

In addition, in the configuration shown in FIG. 23, the transistors 231, 232, 233 and 234 and the rotary transformer 8N can be used to regenerate power from the rotor side to the stator side. Namely, magnetic energy excited by the rotor-side windings and currents can be regenerated to the rotor side, thus sharply reducing the currents, thus raising a response to the current control. In other words, the regeneration to the stator side means that, it is not necessary, in the rotor, to arrange elements, such as electrolytic capacitors, whose strength, lifetime, and other factors need care, or it is possible to reduce the number of such elements used in the rotor side.

In addition, the rotary transformer 8N in FIG. 23 and FIG. 8 indicates the rotary transformer 76 in FIG. 7. However, the rotary transformer may be the rotary transformer 241 shown in (a) in FIG. 24. Alternatively, a three-phase alternating-current rotary transformer may be used. Furthermore, the generator 249 shown in (b) in FIG. 24 may be used. However, the power supply circuit of the transistors, diodes, and the like in FIG. 23 is required to be corrected. In these cases as well, power supply from the stator side to the rotor side and power regeneration from the rotor side to the stator side can be performed.

Next, a method for improving reliability and safety in the motor of the present invention and the control apparatus thereof such as those shown in FIG. 8 will be described. An electric vehicle may be used in a dangerous area, such as an extremely cold region, an extremely hot region, a warzone, or the like. Even should a breakdown, such as damage to a component, occur, reliability and safety can be improved if the motor can be driven through use of the remaining normal sections of the electric vehicle. A reference number 815 in FIG. 8 indicates an abnormal operation monitoring means that monitors the states of the motor and the control apparatus thereof. The abnormal operation monitoring means performs detection of disconnection in the motor windings, insulation failure, and the like, and determines an abnormal state. In addition, the abnormal operation monitoring means stops operation of the faulty component, the section that is abnormally operating, and the like, and issues a command to drive the motor using the normal sections. As a result, while imperfect, minimum driving of the motor can be actualized, and emergency driving can be performed. In particular, in the configuration in FIG. 8, the winding of each phase of the stator and the transistor bridge that drives the current thereof can be electrically separated and insulated from other phases. As a result, stopping and separating of a faulty section is facilitated. Emergency driving can be actualized at a higher probability. Reliability is thereby improved.

The present invention is described above. However, various modifications, applications, and combinations are possible. The number of phases of the stator winding and the rotor winding of the motor can be changed to three phases, five phases, seven phases, eleven phases, and the like. Various types of skewing and the number of slots can also be selected. Discreteness attributed to the number of slots can resolved. In particular, as a result of multiple phases being provided, performance and characteristics of the motor of the present invention can be achieved. The number of components in the driving apparatus increases as a result of multiple phases. However, high integration technology and the like are possible. In theory, there is no increase in the power consumed by the power unit. Regarding the number of poles, an example of two poles is mainly given. However, in practice, four poles, six poles, eight poles, and the like can be selected. The winding method of the windings can be concentrated winding, distributed winding, short-pitched winding, toroidal winding, or the like. Superconductive winding and various cooling mechanisms can also be used.

As the shape of the motor, an outer-rotor motor, an axial gap motor, a linear motor, or motor shapes such as conical or multi-stepped can be selected. A composite motor in which a plurality of motor elements are provided in an inner/outer radial direction or a rotor axial direction is also possible. In addition, combination with other types of motor elements is also possible.

For the soft-magnetic bodies of the motor and the rotary transformer, various materials such as a thin electromagnetic steel sheet, a 6.5% silicon steel sheet, amorphous metal, ferrite, a powder magnetic core, or permendur can be used.

In addition, various permanent magnets can be used. Various high-strength materials and mechanisms can also be used.

Various types of sensors, position detectors, and sensorless position detection technologies can be used. In addition, various technologies for reducing torque ripples, vibrations, and noise in the motor can also be applied. Furthermore, the main-machine motor of an automobile mainly moves forward. Therefore, a motor structure that gives priority to torque in one direction may also be used. The present invention includes configurations to which these technologies have been applied.

Industrial Usability

Various types of sensors, position detectors, and sensorless position detection technologies can be used. In addition, various technologies for reducing torque ripples, vibrations, and noise in the motor can also be applied. Furthermore, the main-machine motor of an automobile mainly moves forward. Therefore, a motor structure that gives priority to torque in one direction may also be used. The present invention includes configurations to which these technologies have been applied.

DESCRIPTIONS OF PARTIAL REFERENCE SIGNS 11 stator
12 rotor
SA, SA/ A-phase windings
SB, SB/ B-phase windings
SC, SC/ C-phase windings
SD, SD/ D-phase windings
SE, SE/ E-phase windings
R1, RI/ rotor windings R1
R2, R2/ rotor windings R2
R3, R3/ rotor windings R3
R4, R4/ rotor windings R4
R5, R5/ rotor windings R5
81 DC power source
86, 89, 8C, 8F, 8J, 8M power drive unit
88, 8B, 8E, 8H, 8L outputs of current detecting means of respective phases
811 control device
812 control command
81A, 81B drive signals for respective transistors
76, 8N rotary transformer
813 rotor position detecting means

The invention claimed is:

1. A motor system comprising:
a stator having a circumferential direction and an axial direction, the stator having a circumferential periphery along the circumferential direction;
multiple-phase stator windings arranged at the stator, the stator windings being windings of multiple phases to which multiple-phase AC currents are supplied as stator currents, the windings of multiple phases being arranged, phase by phase, at predetermined circumferential pitches at the circumferential periphery of the stator, the stator currents passing along the axial direction in the circumferential periphery;
a rotor having a circumferential direction, the rotor having a circumferential periphery along the circumferential direction of the rotor, being opposed to the circumferential periphery of the stator via a gap, and being provided with rotor magnetic poles consisting of N- and S-poles, the rotor magnetic poles providing magnetic salient poles;
a rotor winding arranged at the circumferential periphery of the rotor along the circumferential direction, the rotor winding being arranged in a portion close to the rotor magnetic poles in the circumferential periphery;
stator current supplying means which supply the stator current to each of the stator windings for drive thereof;
rotor current supplying means which supply the rotor current to the rotor winding for drive thereof, the rotor current being transmitted from a fixed part of the motor system to a rotor side; and
current control means which control both the stator currents to the stator windings and the rotor current to the rotor winding based on a rotation position of the rotor such that
the stator currents are substantially synchronized with rotation of the rotor;
the stator currents and the rotor current each include mutually opposed currents whose flowing directions are relatively, in part or in all of the currents, opposite to each other in the axial direction; and
a sum of torque current components generated by the stator currents at the stator and a sum of torque current components generated by the rotor current at the rotor are equal, the torque current components at the stator and the torque current components at the rotor being approximately mutually opposed via the air gap.

2. The motor system according to claim 1, wherein the motor system comprises a field winding arranged in the rotor.

3. The motor system according to claim 1, wherein the rotor current supplying means comprises:
a rotary transformer, a combination of brushes and slip rings, or an AC generator which supply the rotor current; and
a rectifying device which rectifies an output AC voltage and an output AC current to the rotor current which is a DC rotor current.

4. The motor system according to claim 3, wherein the rotary transformer is provided with a stator-side rotary transformer provided with a position sensor which detects a rotor position of the rotor, and
the rotary transformer is also provided with a rotor-side rotary transformer provided with a portion which detects a position of the rotor, the portion including a portion having a small magnetic resistance and a portion having a magnetic resistance which is larger than the small magnetic resistance.

5. The motor system according to claim 1, wherein the rotor current supplying means is configured to generate the rotor current based on the stator current generated by the stator current supplying means and supply the generated rotor current to the rotor winding.

6. The motor system according to claim 1, wherein the rotor current supplying means comprises
a stator power-supplying winding which excites an AC magnetic flux component, which is present at the stator at pitches, the pitches being defined by multiplying an electrical angle 360 degrees by QN times, the QN being an integer of 2 or more;
a rotor power-receiving winding which receives power for the rotor, the power-receiving winding being arranged at the rotor in a circumferential direction thereof and arranged at pitches, the pitches being defined by multiplying an electrical angle 360 degrees by an integer number; and a rectifying device which rectifies an AC voltage and an AC current of the received power to the rotor current which is a DC rotor current.

7. The motor system according to claim 1, wherein the current control means is configured to control a current phase of the stator to the rotation position of the rotor winding.

8. The motor system according to claim 1, wherein the current control means control is configured to control:
i) a field current component supplied at the stator; or ii) a field current component supplied at the rotor, depending on the rotation position of the rotor, the field current component supplied to the stator generating a field magnetic flux for the magnetic fields at the stator, the field current component supplied at the rotor generating a field magnetic flux for the magnetic fields at the rotor; or
iii) the current control means is configured to control both the stator currents to the stator windings or the rotor current to the rotor windings based on the rotation position of the rotor in a state a permanent magnet is embedded in the rotor, the permanent magnet controlling the generation of the magnetic fields at the rotor.

9. The motor system according to claim 1, comprising:
power supplying means which supplies power to the rotor, the power supplying means being a part of the rotor current supplying means provided at the rotor;
wherein the current control means which is a part of the rotor current supplying means.

10. The motor system according to claim 1, wherein the motor is provided as a coreless motor and the stator has a stator back yoke on which the stator windings are wound and the rotor has a rotor back yoke on which the rotor winding is wound.

11. A motor system comprising:
a motor; and
a control device,
wherein the motor comprises
a stator having a circumferential direction and an axial direction, the stator having a circumferential periphery along the circumferential direction;
multiple-phase stator windings arranged at the stator, the stator windings being windings of multiple phases to which multiple-phase AC currents are supplied as stator currents, the windings of multiple phases being arranged, phase by phase, at predetermined circumferential pitches at the circumferential periphery of the stator, the stator currents passing along the axial direction in the circumferential periphery;
a rotor having a circumferential direction, the rotor having a circumferential periphery along the circumferential direction of the rotor, being opposed to the circumferential periphery of the stator via a gap, and being provided with rotor magnetic poles consisting of N- and S-poles, the rotor magnetic poles providing magnetic salient poles; and
a rotor winding arranged at the circumferential periphery of the rotor along the circumferential direction, the rotor winding being arranged in a portion close to the rotor magnetic poles in the circumferential periphery,
the control device comprises
a stator current supplying circuit which supplies the stator current to the stator windings for drive thereof;
a rotor current supplying circuit which supplies the rotor current to the rotor winding for drive thereof, the rotor current being transmitted from a fixed part of the motor system to a rotor side; and
a current control circuit which controls both the stator current to the stator windings and the rotor current to the rotor winding,
wherein the current control circuit is configured to control such that the stator currents are substantially synchronized with rotation of the rotor, the stator currents and the rotor current each include mutually opposed currents whose flowing directions are relatively, in part or in all of the currents, opposite to each other in the axial direction
a sum of torque current components generated by the stator currents at the stator and a sum of torque current components generated by the rotor current at the rotor are equal, the torque current components at the stator and the torque current components at the rotor being approximately mutually opposed via the air gap.

* * * * *